US011032965B2

(12) United States Patent
Klein et al.

(10) Patent No.: US 11,032,965 B2
(45) Date of Patent: Jun. 15, 2021

(54) PNEUMATIC SPREADING MACHINE AND METHOD FOR CONTROLLING OR REGULATING THE METERING ELEMENTS THEREOF BY CARRYING OUT CALIBRATION TESTS

(71) Applicant: RAUCH LANDMASCHINENFABRIK GMBH, Sinzheim (DE)

(72) Inventors: Frédéric Klein, Strasbourg (FR); Fabian Schäfer, Iffezheim (DE); Norbert Rauch, Sinzheim (DE)

(73) Assignee: RAUCH LANDMASCHINENFABRIK GMBH, Sinzheim (DE)

( * ) Notice: Subject to any disclaimer, the term of this patent is extended or adjusted under 35 U.S.C. 154(b) by 156 days.

(21) Appl. No.: 16/341,688

(22) PCT Filed: Oct. 11, 2017

(86) PCT No.: PCT/EP2017/001203

§ 371 (c)(1),
(2) Date: Apr. 12, 2019

(87) PCT Pub. No.: WO2018/068896

PCT Pub. Date: Apr. 19, 2018

(65) Prior Publication Data

US 2020/0037495 A1 Feb. 6, 2020

(30) Foreign Application Priority Data

Oct. 14, 2016 (DE) ..................... 10 2016 012 254.4

(51) Int. Cl.
*A01C 7/00* (2006.01)
*A01C 7/10* (2006.01)
(Continued)

(52) U.S. Cl.
CPC ................ *A01C 7/107* (2013.01); *A01C 7/06* (2013.01); *A01C 7/081* (2013.01); *A01C 7/102* (2013.01); *A01C 21/00* (2013.01); *A01C 21/002* (2013.01)

(58) Field of Classification Search
CPC ......... A01C 7/06; A01C 7/0811; A01C 7/102; A01C 7/107; A01C 21/00; A01C 21/002
(Continued)

(56) References Cited

U.S. PATENT DOCUMENTS 1,750,264 A * 3/1930 Garrow ............... E01C 19/1068 366/40
4,570,491 A * 2/1986 Machnee ............... A01C 7/107 177/50
(Continued)

FOREIGN PATENT DOCUMENTS

CA 2 311 698 A1 12/2001
DE 37 14 642 A1 11/1988
(Continued)

*Primary Examiner* — Viet Le
(74) *Attorney, Agent, or Firm* — McGlew and Tuttle, P.C.

(57) ABSTRACT

A method and pneumatic spreading machine control/regulate a metering element. A transfer chamber downstream of the metering element transfers metered material to a conveying line for spreading. A blower charges the conveying line with an air stream. Spreading elements are downstream of the conveying line. Calibration includes actuating metering elements, charged with a particular type and of material, over a predetermined test duration with a predetermined operating parameter. A mass of material metered during calibration is gravimetrically detected downstream of the metering element and upstream of the transfer chamber or in the transfer chamber, following which the material is transferred to the conveying line and dispensed. A functional relationship between the operating parameter of the dosing element and the actual mass flow of material for spreading,
(Continued)

metered by means of the metering element, is calculated. The metering element is controlled/regulated to a setpoint depending on the functional relationship.

20 Claims, 8 Drawing Sheets

(51) Int. Cl.
*A01C 7/06* (2006.01)
*A01C 7/08* (2006.01)
*A01C 21/00* (2006.01)

(58) Field of Classification Search
USPC .......................................... 111/170, 174, 200
See application file for complete search history.

(56) References Cited

U.S. PATENT DOCUMENTS 5,253,534 A * 10/1993 Hamilton, Jr. ....... A01C 17/008 177/50
6,230,636 B1 * 5/2001 Bom ...................... A01B 49/06 111/13
6,584,920 B1 * 7/2003 Cresswell .............. A01C 7/102 111/174
6,810,823 B2 * 11/2004 Mariman ................. A01C 7/12 111/200
8,170,825 B2 * 5/2012 Beaujot .................. G01G 11/08 702/85
8,408,478 B2 * 4/2013 Wonderlich ........... A01C 7/107 239/1
8,695,396 B2 * 4/2014 Landphair ............. A01C 7/081 73/1.16
8,701,575 B2 * 4/2014 Friggstad ............... A01C 7/125 111/178
8,997,667 B2 * 4/2015 Blunier .................. A01C 15/00 111/118
9,271,439 B2 * 3/2016 Bourgault .............. A01B 49/06
9,326,441 B2 * 5/2016 Donadon ............... A01C 7/107
9,426,940 B2 * 8/2016 Connors ................ A01C 7/105
9,591,799 B2 * 3/2017 Henry .................... A01C 14/00
9,615,506 B2 * 4/2017 Ruppert ................. A01C 15/00
9,675,005 B1 * 6/2017 Bergmeier ............... A01C 7/06
9,686,904 B2 * 6/2017 Roszman ............... A01C 7/082
9,756,774 B1 * 9/2017 Wilson ................. A01B 79/005
9,820,431 B2 * 11/2017 Conrad ............... A01M 7/0092
9,867,329 B2 * 1/2018 Wendte ................. A01M 7/006
9,868,597 B2 * 1/2018 Henry .................... A01C 7/102
9,877,424 B2 * 1/2018 Reineccius .......... G06Q 10/087
9,880,535 B2 * 1/2018 Henry .................. A01B 79/005
9,963,305 B2 * 5/2018 Gervais .................. B65G 53/22
9,989,393 B2 * 6/2018 Hossain .................... G01F 1/34
10,058,023 B2 * 8/2018 Conrad .................... A01C 7/04
10,104,833 B2 * 10/2018 Beaujot .................. B65G 67/04
10,257,974 B1 * 4/2019 Schoeny ................ A01C 7/046
10,408,667 B2 * 9/2019 Schoeny ................... G01F 1/34
10,470,357 B2 * 11/2019 Rice ....................... A01C 7/084
10,531,606 B2 * 1/2020 Posselius ............... A01C 7/082
10,569,972 B2 * 2/2020 Montag ................ A01C 21/005
10,575,456 B2 * 3/2020 Schoeny ................. F16K 1/126
10,681,859 B2 * 6/2020 Rhodes .................. A01C 5/068
10,806,071 B2 * 10/2020 Kowalchuk ............ A01C 7/081
10,823,591 B2 * 11/2020 Yang .................... A01C 23/007
10,827,740 B2 * 11/2020 Wonderlich ......... A01C 23/047
2010/0307395 A1 * 12/2010 Snipes ................... A01C 7/127 111/11
2014/0261119 A1 * 9/2014 Wehler ................... A01B 49/06 111/186

FOREIGN PATENT DOCUMENTS

DE 44 34 963 A1 4/1995
DE 14 31 288 A1 3/1996
DE 296 13 866 U1 11/1996
DE 197 47 029 A1 4/1999
DE 100 37 713 A1 2/2002
DE 101 34 991 A1 2/2003
DE 10 2007 044 178 A1 4/2008
DE 10 2010 053 883 A1 6/2012
DE 10 2014 115 020 A1 4/2015
DE 10 2004 030 240 B4 7/2015
DE 20 2014 009 404 U1 3/2016
EP 0 635 195 A1 1/1995
EP 2 022 308 A1 2/2009
EP 2 420 121 A1 2/2012
EP 2 420 121 B1 9/2013
EP 2 786 649 A2 10/2014
WO 2012/119867 A1 9/2012

* cited by examiner

PNEUMATIC SPREADING MACHINE AND METHOD FOR CONTROLLING OR REGULATING THE METERING ELEMENTS THEREOF BY CARRYING OUT CALIBRATION TESTS

CROSS REFERENCE TO RELATED APPLICATIONS

This application is a United States National Phase Application of International Application PCT/EP2017/001203, filed Oct. 11, 2017, and claims the benefit of priority under 35 U.S.C. § 119 of German Application 10 2016 012 254.4, filed Oct. 14, 2016, the entire contents of which are incorporated herein by reference.

TECHNICAL FIELD

The invention relates to a method for controlling and/or regulating a metering element of a pneumatic spreading machine, comprising

- at least one transfer chamber which is arranged downstream of the metering element and which serves for the transfer, into at least one conveying line, of material for spreading that has been metered by means of the metering element;
- at least one blower for charging the conveying line with an air stream; and
- at least one spreading element arranged downstream of the conveying line, wherein at least one calibration test is performed by virtue of the metering element, charged with a particular type of material for spreading, being actuated over a predetermined test duration with a predetermined operating parameter and the mass of material for spreading metered during the calibration test being gravimetrically detected, following which, from the mass of material for spreading thus obtained in relation to the test duration and the operating parameters of the metering element, a functional relationship between the operating parameter of the metering element and the actual mass flow of material for spreading metered by means of said metering element is calculated, and the metering element is then controlled and/or regulated to a setpoint mass flow of material for spreading in a manner dependent on this functional relationship. The invention also relates to a pneumatic spreading machine designed in particular for carrying out a method of said type, comprising

- at least one metering element;
- at least one transfer chamber which is arranged downstream of the metering element and which serves for transferring, into at least one conveying line, material for spreading that has been metered by means of the metering element;
- at least one blower for charging the conveying line with an air stream;
- at least one spreading element arranged downstream of the conveying line; and
- at least one weighing device to which a particular type of material for spreading which is to be dispensed can be fed by actuation of the metering element over a predetermined test duration with a predetermined operating parameter during a calibration test, in order to gravimetrically detect the mass of material for spreading thus metered.

TECHNICAL BACKGROUND

Pneumatic spreading machines of the above-mentioned type are widely used in the agricultural sector for dispensing predominantly pulverulent and/or particulate material for spreading, such as in particular seeds and/or fertilizer. Here, the material for spreading, which is generally stored in a container, is metered by means of one or more metering elements, which are commonly arranged below an outlet opening of the container, and the metered mass flow of material for spreading is transferred to a multiplicity of spreading elements arranged downstream of the metering element. For the transfer of the material for spreading to the spreading elements, a blower is used which feeds the generated conveying air into a conveying line, in the interior of which—and generally in a line portion thereof below the metering element—there is situated a transfer chamber in order for the flow of material for spreading metered by means of the metering element to be dispersed into the conveying air stream flowing in the conveying line and to be fluidized. For the latter purpose, the conveying line is, in the region of the transfer chamber, commonly although not imperatively equipped with a so-called injector which comprises a nozzle arranged upstream of the transfer chamber in the conveying line and a diffuser, in the form of an expansion nozzle, arranged downstream of the transfer chamber in the conveying line. This transfer chamber is in this case consequently formed between the nozzle and the diffuser. In particular in the case of so-called drill ploughs, the conveying line finally opens out, downstream of the transfer chamber, into a distributor unit, which is designed for example in the form of a distributor head and which has a multiplicity of outlets. The latter are generally arranged so as to be distributed around the circumference of the distributor unit and are adjoined by in each case one spreader line which serves for feeding the flow of material for spreading in partial flows, corresponding to the number of spreader lines, to in each case one spreading element, which spreading elements are arranged with different lateral spacings to the spreading machine. Furthermore, other types of distributor units are also customary, for example in the form of cyclones which separate the particles of material for spreading out of the conveying air stream and which are used predominantly in spreading machines in the form of precision seeding machines.

If the pneumatic spreading machine is for example a fertilizer spreader, such as is known for example from DE 10 2004 030 240 B4, then the spreading elements may be formed for example by impact plates situated at the end of the spreader lines. By contrast, if the pneumatic spreading machine is for example a sowing machine, then the spreading elements may for example comprise sowing coulters for introducing the seeds into the ground. Such spreading machines are known inter alia from DE 44 34 963 A1, DE 197 47 029 A1 or DE 10 2010 053 883 A1.

The container, which is heavy in particular when filled with the material for spreading, is commonly arranged, in the case of known pneumatic spreading machines, on a support structure which extends below the container and which supports the latter. Here, the support structure may be held either by a three-point hitch of a prime mover, such as a tractor, or the spreading machine is in the form of a towed machine which is itself supported on the ground during operation. The housing of the transfer chamber, in particular if it is equipped with an injector with the nozzle and diffuser which each open into said transfer chamber and are commonly arranged coaxially, is for space reasons often arranged transversely with respect to the direction of travel (that is to say the central axis of nozzle and diffuser extends perpendicular to the direction of travel). Furthermore, in particular for large working widths, so-called twin configurations are known which comprise in each case one container, which serves for accommodating the material for spreading, and in each case one pneumatic transport system of the type described above. In this case, the transfer chamber is generally arranged parallel to the direction of travel.

The one or more metering elements of pneumatic spreading machines generally have, depending on the material for spreading that is to be dispensed, cellular wheels or cam wheels which can be controlled and/or regulated with regard to their operating parameters, such as in particular the rotational speed, wherein it is furthermore known for the cellular wheels or cam wheels to be exchangeable for one another in order to adapt the spreading machine to different materials for spreading (cf. for example EP 2 786 649 A2). However, it is basically also possible for use to be made of metering elements equipped with metering slides activatable by activator means, which metering elements interact with a metering opening, wherein, as an operating parameter of such metering elements, the relative position of the metering slide in relation to the metering opening can be controlled and/or regulated.

In order to regulate the one or more metering elements of generic pneumatic spreading machines to a desired set point mass flow of material for spreading, DE 10 2014 115 020 A1 for example describes a regulation method in which the actual mass flow of the particles of material for spreading dispersed into the conveying air stream is detected in the conveying line by means of a sensor, such as a piezo sensor, and is transmitted to a regulating device of the spreading machine, which determines a manipulated variable in a manner dependent on the set point mass flow, and correspondingly regulates the metering elements to the set point mass flow. In this regard, it is the intention to continuously determine a corrective factor as a ratio of the actual mass flow in relation to the actual rotational speed or frequency of the metering element, such that the set point mass flow can, with the aid of the corrective factor, be converted into a setpoint rotational speed or frequency of the metering element. The regulating device determines the manipulated variable acting on the metering element—in this case the rotational speed or frequency—in a manner dependent on a control error which is determined as a difference between the setpoint rotational speed and the actual rotational speed. However, such methods have hitherto not been able to become established on the market because the detection of the actual mass flow of fluidized particles of material for spreading using sensor means is error-prone and also susceptible to faults, wherein even local deposits and/or fouling can lead to failure of the mass flow regulation.

This also applies to DE 100 37 713 A1 which describes a spreading machine in the form of a drill plough, which comprises a metering element in the form of a sowing wheel which meters the metered seeds into a transfer chamber arranged below the metering element, which metering chamber is adjoined by a conveying line charged with an air stream. Downstream of the metering element, there is provided a counter device which is in the form of a light barrier, a sensor device or an impact device and which counts a partial quantity of the seeds to be dispensed, in order to regulate the sowing quantity in a manner dependent on this and on the working speed. Aside from the above-mentioned disadvantages generally associated with a corresponding sensor arrangement, there is also the problem here that only a partial quantity of the total mass flow of material for spreading that is to be metered can be fed to the counter device, in order that the particles of material for spreading can form a countable layer. Owing to the commonly non-linear dependency of the metered mass flow in relation to the rotational speed of the metering element, there are consequently scattering errors in the dispensing of the (total) setpoint mass flow of material for spreading.

In practice, calibration tests are therefore performed, as before, by virtue of the metering element, charged with a particular type of material for spreading, being actuated over a predetermined test duration with a predetermined operating parameter—commonly the rotational speed of the metering element designed as a cellular wheel or cam wheel—and the mass of material for spreading metered during the calibration test being gravimetrically detected. From the mass of material for spreading thus obtained in relation to the test duration and the operating parameters of the metering element, it is then possible to calculate a functional relationship between the operating parameter of the metering element and the mass flow of material for spreading metered by means of said metering element, and the metering element can then be controlled and/or regulated in a manner dependent on this functional relationship to a setpoint mass flow of material for spreading. Here, for the calibration test, it is essential that all of the material for spreading metered during the execution of said test can be collected, and no fractions thereof remain for example in components of the spreading machine, in order to ensure high accuracy of the adjustment of the metering element during the later working step of fertilizing/sowing and in order, both for economic reasons and for environmental protection reasons, to avoid incorrect metering, also referred to as "calibration errors", in particular over-metering, owing to material for spreading being only partially collected during a calibration test.

Whereas, in many cases, such calibration tests are performed manually before the commencement of spreading work by virtue of the metering element being actuated in the above manner and material for spreading metered during the operation test being collected in a test container to be placed below the metering element, following which the test container with the collected mass of material for spreading is manually weighed, and a characteristic value that identifies the desired spread quantity of material for spreading per unit of metering time is input into a control device of the spreading machine (cf. for example EP 0 635 195 A1, DE 44 31 288 A1, EP 2 022 308 A1, DE 10 2007 044 178 A1 or DE 20 2014 009 404 U1), such an approach is firstly relatively cumbersome for the farmer, and secondly, the metering accuracy achieved in this way leaves something to be desired, because the actual mass flow of the same material for spreading may change in the case of a constant rotational speed of the metering element during the ongoing spreading work, in particular owing to moisture. Moreover, manual inputting of values into the control device basically also exhibits high susceptibility to errors.

Therefore, generic pneumatic spreading machines are also known in which the calibration tests can be performed firstly in automated fashion and secondly at various points in time during the spreading work, for example as the spreading machine is turning at the headland etc., in order to keep the functional relationship between the rotational speed of the metering element and the actual mass flow of material for spreading metered by means of said metering element up-to-date at all times and to consequently ensure continuously high metering accuracy.

For example, DE 101 34 991 A1 describes a pneumatic drill plough with a seed container, with a metering element designed in the form of a cellular wheel, and with a counting device for counting the particles of material for spreading that have been metered during automated calibration tests. The counting device is designed as a pneumatic counting device and comprises a cellular wheel with bores arranged spaced apart from one another in the outer region thereof, a suction device that sucks the particles of material for spreading into the bores, and a particle separating device which separates the sucked-in particles out of the bores. Two sensors which are arranged in each case in front of and behind the particle separating device in a direction of rotation of the cellular wheel serve for counting the particles of material for spreading metered during the calibration test, wherein the result of this count is transmitted to a regulating device which regulates the metering element in accordance with the desired spreading. The counting device is arranged in the interior of the seed container, wherein, in a portion of the conveying line arranged between the metering element and the distributor head, there is provided a switch which, during the execution of a calibration test, diverts the metered particles of material for spreading to the counting device, whereas, during the spreading work, said switch conducts said particles to the distributor unit designed in the form of a distributor head. Aside from the cumbersome design of the particle counting device from a structural aspect, a disadvantage consists in particular in that the particles of material for spreading that are conducted in a circuit to the counting device during a calibration test can accumulate or remain at numerous locations in the spreading machine, for example in the injector or in the conveying line itself, such that there is the risk of metering errors if not all of the particles of material for spreading can be counted. Moreover, the calibration test is relatively time-consuming.

EP 2 420 121 B1 describes a pneumatic spreading machine designed in particular in the form of a sowing machine, having a storage container for accommodating the material for spreading, having a metering element and having transfer chamber, arranged below said metering element, with an injector, which opens into a conveying line for the fluidized flow of material for spreading. Furthermore, the spreading machine comprises a weighing container arranged below the injector, which weighing container serves for the selective weighing of a metered fraction of material for spreading from the storage container during a calibration test and can be connected to or separated from said storage container by means of a calibration valve. In order to carry out a calibration test, the calibration valve has consequently opened, such that the material for spreading metered by means of a predefined number of rotations of the metering element falls into the weighing container, where the mass of said material for spreading is gravimetrically detected by means of a weighing cell. By contrast, during the spreading work, the calibration valve is closed, such that the metered material for spreading is released from the metering element directly to the injector. It has proven to be disadvantageous in particular that the material for spreading collected in the weighing container must, after every calibration test, be recirculated into the storage container by means of an additional recirculation line, which is equipped with an additional blower. Furthermore, the housing of the transfer chamber of pneumatic spreading machines, whether or not equipped with an injector, should basically, in order to achieve as low as possible a center of gravity of the machine and in order to satisfy the demands for realizing as large as possible a capacity of the storage container, be arranged at a very low height below the metering element, which is possible only to a limited extent with the weighing container, including its recirculation line, provided below the injector. In order to be able to combine the working processes of fertilizing and/or sowing with working processes of cultivation in a space-saving manner, generic pneumatic spreading machines, in particular in the form of so-called drill ploughs, are furthermore commonly equipped with active or passive cultivation units such as for example packer rollers, rotary harrows and the like, which additionally restricts the structural space required for the weighing container.

SUMMARY

The invention is therefore based on an object of further developing a pneumatic spreading machine and a method for controlling and/or regulating the metering element thereof of the type mentioned in the introduction while at least substantially avoiding the above-stated disadvantages, such that automated execution of calibration tests with high accuracy is ensured.

With regard to a method, said object is achieved, in the case of a method for controlling and/or regulating a metering element of a pneumatic spreading machine of the type mentioned in the introduction, in that the mass of material for spreading metered during the calibration test is gravimetrically detected downstream of the metering element and upstream of the transfer chamber or in the transfer chamber, following which said material for spreading is transferred to the conveying line and dispensed.

With regard to a device, to achieve said object in the case of a pneumatic spreading machine of the type mentioned in the introduction, the invention furthermore provides that the weighing device is arranged downstream of the metering element and upstream of the transfer chamber, in or at the transfer chamber, such that the mass of material for spreading metered during the calibration test can be transferred to the conveying line and dispensed.

Owing to the fact that the gravimetric detection of the material for spreading metered during a calibration test performed in automated fashion is weighed downstream of the metering element and upstream of the transfer chamber or in the latter, wherein the weighing device is consequently likewise arranged downstream of the metering element and upstream of the transfer chamber or in or at the transfer chamber itself, the embodiment according to the invention firstly eliminates the need for additional recirculation lines for the material for spreading into the storage container thereof, such that there is also no risk of contamination of the material for spreading that is stored therein. In particular, however, the risk of metering errors is minimized since the gravimetric detection of the material for spreading is performed directly downstream of the metering element, such that it is ensured that all of the material for spreading metered during a calibration test is also actually weighed and does not, on the path to a weighing device provided spaced apart from the metering element, for example a weighing device in the interior of the container, remain partially disregarded owing to deposits in various components of the pneumatic spreading machine. This is also associated with a time-saving, such that the calibration test can be performed relatively quickly and consequently even during short interruptions in the spreading work. The gravimetric detection of the material for spreading may in this case be performed when the blower is deactivated, because said blower is not necessarily required for transporting the material for spreading from the metering element to the weighing device. A particular advantage of the embodiment according to the invention furthermore consists in that material for spreading that is metered and weighed during a calibration test can subsequently be dispensed in controlled fashion via the transfer chamber and via the spreader lines adjoining said transfer chamber via the conveying line, for example by activation of the blower, such that the dead times that basically exist during the commencement of operation of generic spreading machines—be it at the start of the spreading work or after interruptions thereof, for example when traveling from the headland into the field interior—(the material for spreading metered by the metering element must be fed by means of the activated blower to the transfer chamber and pass from there via the conveying and spreader lines and, after having possibly passed a distributor unit, to the spreading elements) can be bridged.

If the spreading machines has multiple metering elements with in each case one transfer chamber arranged downstream thereof, then it is self-evidently possible for a weighing device designed in the manner according to the invention to be arranged downstream of each metering element, in order to operate the metering elements in each case correspondingly to the functional relationship, obtained by means of the calibration tests, between the operating parameter of the respective metering element and the actual mass flow metered by means of said metering element. However, on the other hand, it is also conceivable for only one weighing device to be provided for carrying out the calibration tests by means of the mass of material for spreading metered by means of one of the metering elements, and for the other metering elements that are not equipped with a weighing device to be operated correspondingly to the functional relationship, obtained from this, between the operating parameter of the one metering element and the actual mass flow metered by means of said metering element, by virtue of the functional relationship consequently being "transferred" to the other metering elements.

In order that, after each calibration test, the spreading machine can automatically control and/or regulate the desired mass flow of material for spreading, without the mass of material for spreading detected during the calibration test, or a value representative of this, having to be manually input, the spreading machine may preferably have a control and/or regulating device which is operatively connected both to the weighing device and to the metering element and which is designed to, from the mass of material for spreading detected by means of the weighing device in relation to the test duration and the operating parameter of the metering element, such as for example the rotational speed, the number of rotations, the number of emptied cells or cam troughs of the metering wheel or the like, during the calibration test, calculate a functional relationship between the operating parameter of the metering element and the actual mass flow of material for spreading metered by means of said metering element, and to subsequently control and/or regulates the metering element to a setpoint mass flow of material for spreading in a manner dependent on this functional relationship. The functional relationship may furthermore, in a manner known per se, involve a factor, a characteristic line or curve, a characteristic map or the like.

As already indicated, the invention provides in particular that the material for spreading metered during the calibration test

- is collected downstream of the metering element and upstream of the transfer chamber, the mass thereof is gravimetrically detected, and it is then released to the transfer chamber; or
- is collected in the transfer chamber when the blower is decoupled from said transfer chamber and/or deactivated, and the mass thereof is gravimetrically detected, following which the injector is coupled to the blower and/or the latter is activated, such that the material for spreading metered during the calibration test is, in both cases, dispensed in controlled fashion at the start of the spreading work.

With regard to a device, for this purpose, various design embodiments may be provided, wherein the weighing device should always be closed on all sides or "encapsulated" and/or accommodated entirely in the interior of the conveying components situated between the metering element and the transfer chamber, so as to protect the material for conveying against external action and so as not to falsify the measurement result. Accordingly, according to a first advantageous embodiment, it may be provided for example that the weighing device is arranged downstream of the metering element and upstream of the transfer chamber, wherein the material for spreading can be fed selectively either to the weighing device or, past the latter, to the transfer chamber. The weighing device is consequently arranged in particular parallel to a line connecting the metering element to the transfer chamber, from which line it can be transferred selectively directly to the transfer chamber (during spreading work) or firstly to the weighing device (during a calibration test) and from there to the transfer chamber (after the calibration test at the start of the spreading work).

In this context, according to one design variant, provision may be made for the weighing device to comprise a weighing container which, by means of a switch arranged in a line connecting the metering element to the transfer chamber, is selectively connectable to the metering element or separable therefrom, wherein the weighing container in particular

- has at least one weighing cell arranged in the interior thereof; or
- is mechanically decoupled from the line connecting the metering element to the transfer chamber, and is connected to an external container balance.

As already mentioned, the switch, which is designed for example in the form of a guide flap, is consequently set, during a calibration test, such that it conducts the metered particles of material for spreading directly to the weighing container, wherein the particles of material for spreading are, after the weighing that is performed there at the start of the spreading work, transferred from the weighing container into the injector for example by means of a flap that can be set into an open position and into a closed position, whereas, during the spreading work, the switch transfers the particles of material for spreading past the weighing container directly to the transfer chamber, such that the particles of material for spreading do not have to pass through the weighing container. In the case of a weighing container connected to an external container balance, the mechanical decoupling thereof on the one hand from the line which connects the metering element to the transfer chamber and which is equipped with the switch, and on the other hand from the connection, which is to be opened and closed, of the weighing container to the transfer chamber, may be realized for example in a manner known per se by means of flexible line pieces, composed for example of elastically flexible materials, such as silicone, rubber etc., composed of flexibly pliable materials, such as (filter) fabrics and the like, by means of bellows etc.

According to a further design variant, provision may be made in this context for the weighing device to have a weighing container with at least one weighing cell arranged in the interior thereof and to be mounted so as to be pivotable, in relation to a line connecting the metering element to the transfer chamber, between at least one weighing position, in which said line opens into the weighing container, and at least one transfer position, in which the weighing container opens into the transfer chamber, wherein the transfer chamber in particular

- is arranged on a rotary slide by means of which said transfer chamber is rotatable between the at least one weighing position, in which said transfer chamber is arranged outside the line connecting said transfer chamber to the metering element, and the at least one transfer position, in which both the weighing container and the line connecting the metering element to the transfer chamber open into said transfer chamber; or
- is itself mounted so as to be pivotable, in relation to the line connecting said transfer chamber to the metering element, between the at least one weighing position, in which said transfer chamber is pivoted away from the line connecting said transfer chamber to the metering element, and the at least one transfer position, in which both the weighing container and the line connecting the metering element to the transfer chamber open into said transfer chamber.

In the former case, the transfer chamber can consequently, by means of the rotary slide, be rotated out of its operating position, in which it is connected via the line to the metering element, into the weighing position, in which it is arranged outside the line connecting it to the metering element in the operating position. In the operating position, in turn, the weighing container, which is for example pivotable articulated on the circumference of the line, can be connected to the line which connects the metering element to the transfer chamber in the operating position, by virtue of said weighing container being pivoted into the cross section of said line, such that the calibration test can be performed. Subsequently, the weighing container is pivoted out of its weighing position again, and the transfer chamber is rotated by means of the rotary slide into the transfer position, which corresponds in particular to its operating position, in which firstly the material for spreading metered by means of the metering element can pass into the transfer chamber, and in which secondly the material for spreading received in the weighing container can be transferred into the transfer chamber. The latter may in turn be performed for example by means of a closure flap, in the open state of which the material for spreading falls from the weighing container into the transfer chamber at the start of spreading work after the calibration test.

In the latter case, both the weighing container and the transfer chamber are, for example at substantially oppositely situated pivot bearings on the circumference of the line which connects the metering element to the transfer chamber in the operating position, articulated pivotably on said line, such that they can each be connected to the line by pivoting in order to perform a calibration test or in order to dispense the material for spreading during the spreading work. After the calibration test has ended, the transfer chamber is consequently pivoted into its transfer position, which corresponds in particular to the operating position, in which the material for spreading received in the weighing container can be transferred into the transfer chamber. This may in turn be performed for example by means of a closure flap, in the open state of which the material for spreading falls from the weighing container into the transfer chamber at the start of the spreading work after the calibration test.

According to a further design variant, provision may be made for the weighing device to have a weighing container with at least one weighing cell arranged in the interior thereof, and both the transfer chamber and the weighing container are arranged on a linear slide which acts in particular substantially perpendicularly with respect to a line connecting the metering element to the transfer chamber, wherein the transfer chamber and the weighing container are displaceable between at least one weighing position, in which the line connecting the metering element to the transfer chamber opens into the weighing container and the transfer chamber is arranged outside the cross section of said line, and at least one operating position, in which the line connecting the metering element to the transfer chamber opens into the transfer chamber and the weighing container is arranged outside the cross section of said line, and wherein furthermore, the weighing container is, in particular by means of a flap, selectively connectable to the transfer chamber and separable therefrom. In this case, the transfer chamber and the weighing container can consequently be displaced, in particular jointly, by means of the linear slide, in order to either connect the weighing container to the metering element in order to carry out a calibration test or connect the transfer chamber to the metering element during spreading work. The transfer of the material for spreading received in the weighing container after a calibration test into the transfer chamber may in turn be performed by means of a closure flap, in the open state of which the material for spreading falls from the weighing container into the transfer chamber at the start of spreading work.

In all of the above mentioned design variants, the transfer of the material for spreading metered during a calibration test from the weighing container into the transfer chamber may be performed preferably under the action of gravitational force, by virtue of the weighing container, at least in its transfer position, being arranged at a corresponding height at least partially above the transfer chamber. Alternatively or in addition, it is for example also conceivable for the transfer of the material for spreading metered during a calibration test from the weighing container into the transfer chamber to be performed by means of the air stream generated by the blower, by virtue of the material for spreading being for example suctioned from the weighing container into the transfer chamber.

In an alternative design variant, which does not require a separate weighing container, provision may for example also be made whereby the weighing device

- has a flap which is arranged in the line connecting the metering element to the transfer chamber and which is pivotable between a weighing position, in which it closes the line cross section, and an operating position, in which it at least partially opens up the line cross section, wherein the flap is equipped with a weighing cell and/or the pivot axle thereof is equipped with a torque or torsion sensor; or
- has a slide arranged in the a line connecting the metering element to the transfer chamber, which slide is displaceable between a weighing position, in which it closes the line cross section, and an operating position, in which it at least partially opens up the line cross section, wherein the slide is equipped with a weighing cell.

The material for spreading metered during a calibration test is consequently, with the flap closed or with the slide closed, collected directly in the line connecting the metering element to the transfer chamber, in order for the mass of said material for spreading to be gravimetrically detected, following which the flap is opened, or the slide is pulled out of the line, in order for the collected material for spreading to be transferred to the transfer chamber and dispensed at the start of the "normal" spreading work. The displacement direction of the slide in this case expediently extends approximately perpendicular to the line connecting the metering element to the transfer chamber. Said line may preferably be equipped with suitable sealing lips which, when the flap or the slide is in the closed position, bear against the flap or against the slide, such that weighing errors can be avoided even if the transfer chamber below the flap or the slide is impinged on with the conveying air stream by the blower whilst the calibration test is being performed.

In a second advantageous embodiment, which likewise does not require a separate weighing container and in the case of which the material for spreading metered during a calibration test is collected directly in the transfer chamber with the blower decoupled from said transfer chamber and/or deactivated, in order for the mass of said material for spreading to be gravimetrically detected, following which the transfer chamber is coupled to the blower and/or said blower is activated in order to dispense the material for spreading, one design variant may provide for the weighing device to comprise a weighing cell which is arranged in the interior of the transfer chamber, in particular at the base thereof, wherein the weighing cell can in particular be exposed and covered by means of a slide situated at the inside. The weighing cell is consequently positioned in the interior of the transfer chamber such that the material for spreading metered by means of the metering element falls directly onto said weighing cell, without the possibility of losses occurring which are not gravimetrically detected. In order to protect the weighing cell during spreading work, said weighing cell may preferably be covered by means of the slide, and exposed only for the purposes of performing a calibration test.

In a further design variant, it may be provided in this context that at least one lower portion of the transfer chamber is connected

- by means of at least one weighing cell; or
- by means of at least one pivot bearing equipped with a torque or torsion sensor to the line connecting the metering element to the transfer chamber. The entire transfer chamber, or else only one—lower—part thereof, can consequently be connected either by means of the weighing cells, or by means of the pivot bearing equipped with the sensor, to the line connecting the metering element to the transfer chamber, such that the material for spreading metered during a calibration test is in turn collected in the transfer chamber itself in order for its mass to be gravimetrically detected.

To ensure that, during the execution of calibration tests, the blower does not introduce any air stream into the transfer chamber in the manner mentioned above, the control and/or regulating device may expediently deactivate the blower or separate said blower from the transfer chamber, for example by means of a shut-off flap or the like, wherein it is alternatively or additionally for example also possible for a warning message to be generated if, for example in the event of a fault, in the case of the blower being active during a calibration test, the weighing device detects the mass of material for spreading hereby metered.

In order to be able to access the functional relationships, determined by means of a multiplicity of calibration tests, between the operating parameter of the metering element and the actual mass flow, metered by means of said metering element, of particular materials for spreading at a later point in time, and in order to preferably keep the functional relationship up-to-date at all times during spreading work, in order to thereby take into consideration in particular physical changes of the material for spreading, such as may arise for example owing to an ingress of moisture, provision may be made, in an advantageous embodiment of the method according to the invention, whereby the functional relationship, obtained from the mass of a particular type of material for spreading gravimetrically detected during a calibration test in relation to the test duration and the operating parameter of the metering element, between the operating parameter of the metering element and the actual mass flow of material for spreading is stored, in particular in the form of a metering factor, in order for said functional relationship to be retrievable when required, wherein it is updated in particular when a further calibration test is carried out.

In the case of a correspondingly designed spreading machine, provision may accordingly be made, in an advantageous refinement, whereby the control and/or regulating device is designed to store the functional relationship, obtained from the mass of a particular type of material for spreading gravimetrically detected during a calibration test in relation to the test duration and the operating parameter of the metering element, between the operating parameter of the metering element and the actual mass flow of material for spreading, in particular in the form of a metering factor, or is connected to a memory device suitable for this purpose, in order for said functional relationship to be retrievable when required, wherein the control and/or regulating device is in particular designed to update the functional relationship when a further calibration test is carried out.

With regard to the bridging, mentioned in the introduction, of the dead times upon the commencement of operation of generic spreading machines—be it at the start of spreading work or be it for example after traveling through the headland—it may prove to be expedient in particular if the mass of material for spreading metered during the calibration test is transferred to the conveying line and dispensed as or immediately before the metering element is, after the end of the calibration test, returned to its normal operating state, in which it is controlled and/or regulated in accordance with the desired setpoint mass flow. In this way, the mass of material for spreading metered during the calibration test can consequently be dispensed at a point in time before the material for spreading newly metered by the metering element upon the commencement (resumption) of the spreading work can pass to the transfer chamber and from there via the conveying or spreader line(s) to the spreading elements, such that a spontaneous start of operation is ensured and local deficiencies in the supply of material for spreading to the ground to be covered are avoided.

In the case of a spreading machine configured for this purpose, provision may consequently preferably be made whereby the control and/or regulating device is designed to set the metering element into its normal operating state, in which it controls and/or regulates the metering element in accordance with the desired setpoint mass flow, as or immediately after the mass of material for spreading metered during the calibration test is, after the end of the calibration test, transferred to the conveying line and dispensed. The latter may for example be realized in a simple manner by virtue of the quantity of material for spreading metered during the calibration test, which either is already situated in the transfer chamber or has for example been transferred from a weighing container to said transfer chamber, being fluidized, and introduced into the conveying line, in order to feed the material for spreading via the spreader lines to the respective spreading elements, by activation of the blower or opening of a shut-off flap in a blowing air line which connects the blower to the transfer chamber.

Furthermore, it may self-evidently be advantageous if, in the control and/or regulation of the metering element, in a manner dependent on the functional relationship between the operating parameter of the metering element and the mass of material for spreading metered during the preceding calibration test, to the desired setpoint mass flow of material for spreading, at least one spreading parameter from the group comprising
   working width,
   traveling speed and
   actual position of the spreading machine is also taken into consideration.
The actual position of the spreading machine may in this case be determined, in a manner known per se, by means of a GPS receiver connected to the control and/or regulating device, such that it is possible, in particular in the case of dispensing of fertilizer, to allow for different setpoint mass flows of material for spreading in accordance with an electronic application map. The traveling speed may likewise be determined for example by means of GPS or by means of sensors that are customary for this purpose, or else may be input into the control and/or regulating device. The latter indeed also applies to the desired working width, including partial width switching configurations.

In the case of a spreading machine configured for carrying out such a method, provision may accordingly preferably be made whereby, in the control and/or regulation of the metering element, in a manner dependent on the functional relationship between the operating parameter of the metering element and the mass of material for spreading metered by means of said metering elements during the preceding calibration test, to the desired setpoint mass flow of material for spreading, also takes into consideration at least one spreading parameter from the group comprising
   working width,
   traveling speed and
   actual position of the spreading machine.
For this purpose, said control and/or regulating device is equipped in particular with a GPS receiver, which is operatively connected to the control and/or regulating device, and/or to corresponding sensors of the above-stated type.

Finally, in particular with regard to the first execution of a calibration test after the storage container of the spreading machine has been filled with fresh material for spreading and spreading work is to be commenced, it may be expedient if, for the calibration test, a predetermined test duration is taken into consideration, at the start of which the metering element was already actuated, wherein, for the detection of the mass of material for spreading metered during the calibration test, the difference between the mass at the end of the test duration and at the start of the test duration is determined. In this way, it is ensured that the cells or the cam troughs of a metering wheel of the metering element are fully filled with the relevant material for spreading in the predetermined test duration, and it is not for example the case that cells or cam troughs of the metering wheel which are initially still (partially) empty or are (partially) filled with "old" material for spreading with a different density falsify the calibration test. Here, the metering wheel may for example be rotated with the operating parameter predetermined for the calibration test, for example at least one half of one rotation, such that it is fully filled with the "present" material for spreading, following which the calibration test itself begins for the first time. The residual material for spreading that is possibly metered here however remains disregarded for the calibration test owing to the fact that, for the detection of the mass of material for spreading metered during the calibration test, only the difference between the mass at the end of the test duration and at the start of the test duration is determined. This may be realized in a manner known per se by means of known so-called "tare functions" of the weighing cells used, or else by means of electronic calculation of the difference between the measured value of the mass of material for spreading at the end of the test duration and at the start of the test duration.

Further features and advantages of the invention will emerge from the following description of exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
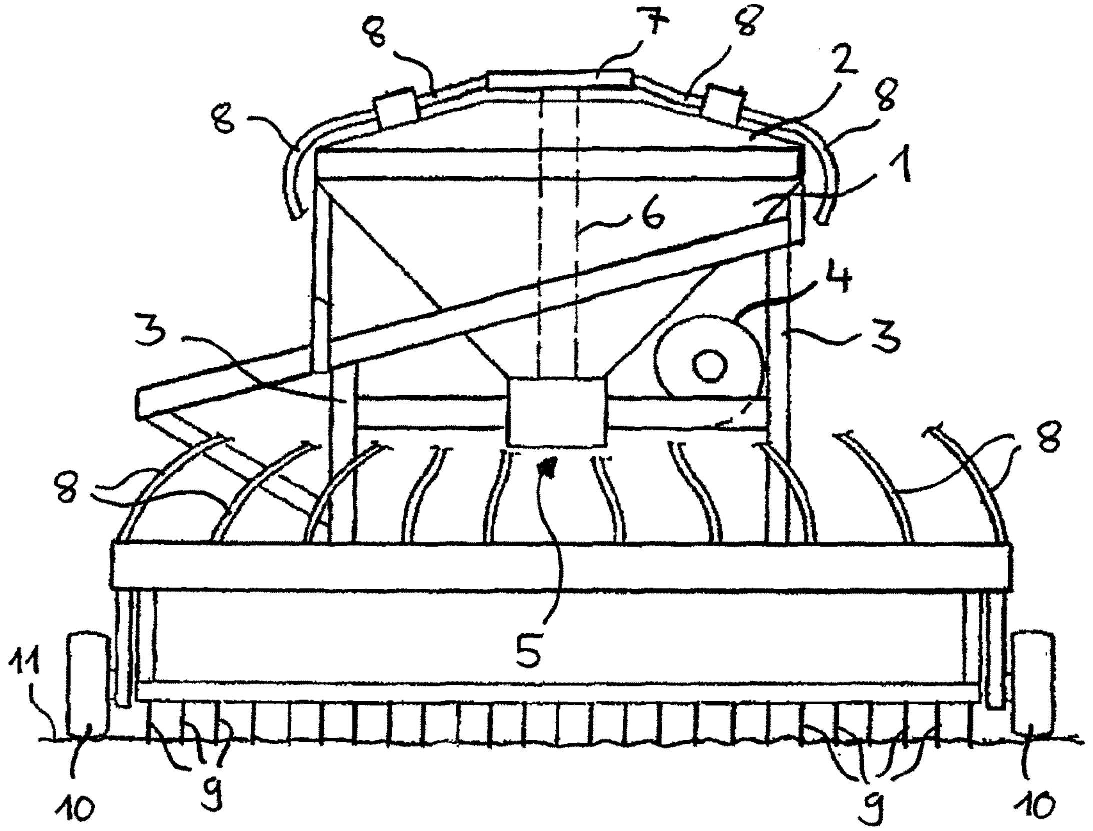
FIG. 1 is a schematic view of an embodiment of a pneumatic spreading machine, designed in the form of a drill plough, viewed from the rear.
Figure 2:
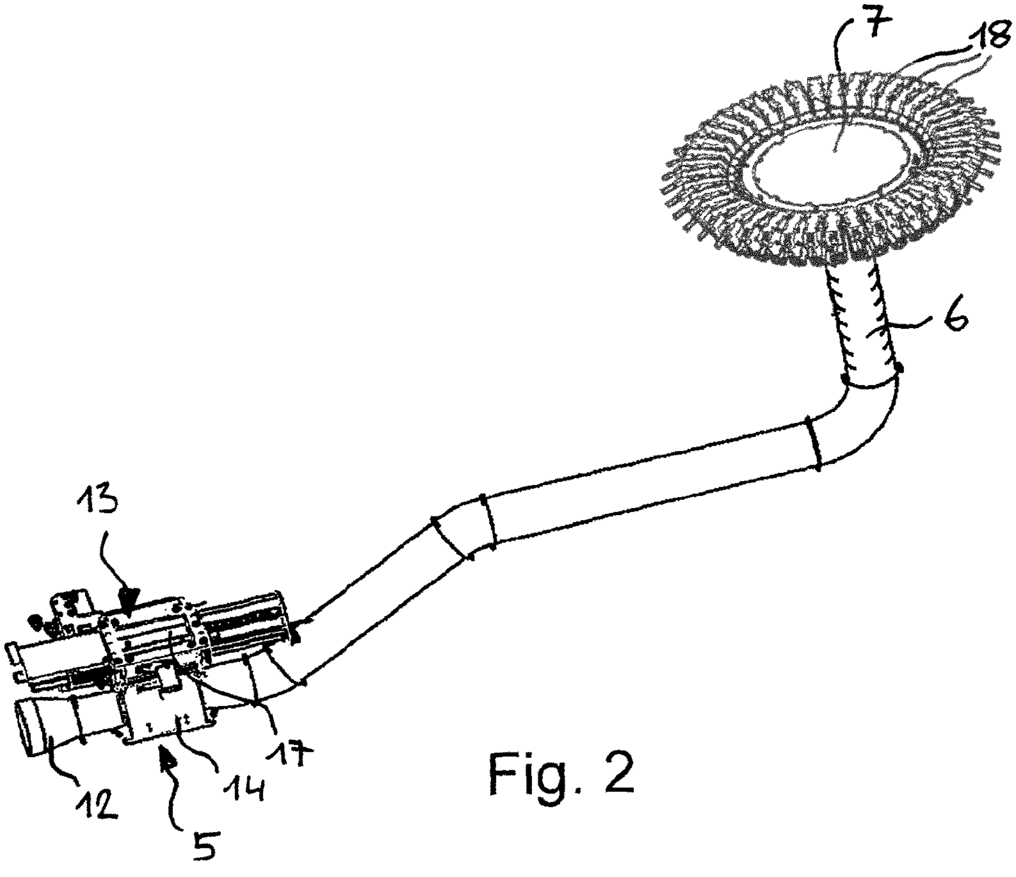
FIG. 2 is a schematic perspective view of the distributor unit, designed in the form of a distributor head, of the spreading machine as per FIG. 1, including the metering element, the housing of the transfer chamber and the pneumatic conveying components.

Referring to the drawings, FIG. 1 schematically shows an exemplary embodiment of a pneumatic spreading machine which, in the present case, is designed in the form of a sowing machine or drill plough and which can be detachably fixed for example to a conventional three-point linkage of a prime mover, such as a tractor. Said spreading machine comprises a storage container 1 for accommodating material for spreading, such as for example seeds and/or fertilizer, having a cover 2, which are supported on supports 3 of a frame. To the latter there is also fixed a blower 4 for generating an air stream. Below an outlet of the container 1, which for example tapers downward in funnel-shaped form, there is situated a housing 5, which can be seen in more detail in FIG. 2 and in particular in FIG. 3, of a transfer chamber 14, which serves for the transfer of the material for spreading to a conveying line 6. The latter is charged with an air stream by the blower 4 in order to convey the material for spreading upward into a distributor unit 7. The distributor unit 7 is in the present case formed by a distributor head and comprises a multiplicity of connectors, which are arranged so as to be distributed around the circumference of said distributor head and which in the present case extend approximately radially outwards and to which in each case one spreader line 8 is connected. The connection of the spreader lines 8 may be realized for example by means of in each case one housing 18 (c.f. FIG. 2), which is expediently equipped with in each case one shut-off element for interrupting the fluidized flow of material for spreading in accordance with demand, in order to be able to provide different working widths or also partial width switching configurations. The spreader lines 8 which extend from the distributor head of the distributor unit 7 and which may for example be formed in the manner of hoses, and which are illustrated in cutaway form in FIG. 1 for the sake of clarity, are led downward and rearward, wherein, at their free ends averted from the distributor unit 7, said spreader lines are equipped with spreading elements. In the case of the sowing machine shown by way of example in FIG. 1, said spreading elements are sowing coulters (not visible in detail) with furrow closers 9, so-called harrows, which are arranged downstream of said sowing coulters. The frame of the spreading machine may furthermore be supported on the ground 11, and in particular lifted off therefrom, by means of support wheels 10.

FIG. 2 shows the pneumatic conveying components of the spreading machine as per FIG. 1, which serve for the transfer of the material for spreading from the transfer chamber 14, which is situated in the interior of the housing 5, into the distributor unit 7, which is designed in the form of a distributor head, via the conveying line 6. The latter has, at its end averted from the distributor unit 7, a connecting piece 12 for the fluidic contacting of the blower 4 (see FIG. 1), wherein, downstream of the connector piece 12, the outlet of the metering housing 13 of a metering element (described in more detail further below) opens into the transfer chamber 14, which is extended through by the conveying line 6. From there, the material for spreading dispersed in the air stream passes firstly via an approximately horizontal portion of the conveying line 6 into a riser pipe portion thereof, which opens into the center of the distributor head of the distributor unit 7 from below, around the circumference of which the radial connectors for the housings 18 are arranged, which are in turn adjoined by in each case one spreader line 8 which is not illustrated again in the drawing in FIG. 2.

As can also be seen from FIG. 2 and in particular FIG. 3, in the interior of the housing 5 of the transfer chamber 14 which is arranged below the metering housing 13 and which in the present case is extended through, for example transversely with respect to the direction of travel, by the conveying line 6, there are accommodated both a nozzle 15 and a diffuser 16, designed in the form of an expansion nozzle, of an injector, which nozzle and diffuser are arranged coaxially and for example perpendicularly with respect to the direction of travel of the spreading machine at the lowest point thereof. The transfer chamber 14 is in this case situated in the intermediate space between the nozzle 15 and the diffuser 16 of the injector. Whereas the nozzle 15 of the injector is connected, at the left-hand end of the housing 5 of the transfer chamber 14 in FIG. 2, to the blower 4 (see FIG. 1), the diffuser 16 of the injector is adjoined at the right-hand end of the housing 5 of the transfer chamber 14 in FIG. 2 by the conveying line 6. In this way, the material for spreading, after having been metered in a desired mass flow by means of the metering element accommodated in the metering housing 13, is transferred, in the transfer chamber 14 arranged between the nozzle 15 and the diffuser 16 of the injector, into the diffuser 16 by means of the gas stream flowing in via the nozzle 15, and passes from there into the conveying line 6.

Figure 3:
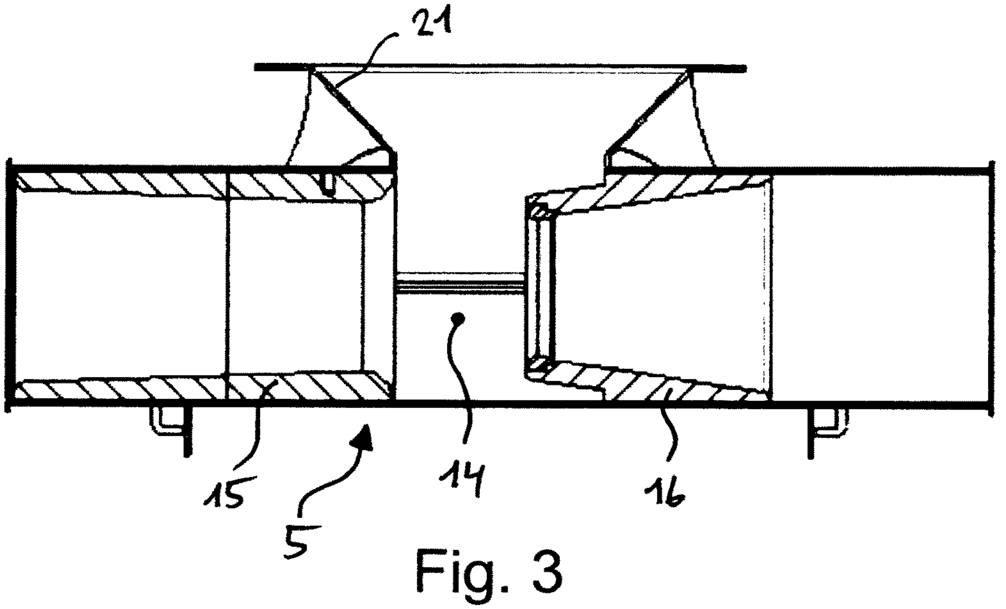
FIG. 3 is a schematic, partially sectional detail view of an embodiment of a transfer chamber of the spreading machine as per FIGS. 1 and 2, which is formed between the nozzle and the diffuser of an injector, but without the metering element.

The spreading machine shown in FIGS. 1 to 3 is furthermore equipped with a control and/or regulating device (not illustrated in the drawing) which controls and/or regulates the functional components of the spreading machine and is operatively connected inter alia to a weighing device 100 (discussed in detail further below with reference to FIGS. 4 to 14) to which a respective type of material for spreading which is stored in the storage container 1 and which is to be dispensed can be fed by actuation of the metering element 17 over a predetermined test duration with a predetermined operating parameter during a calibration test, in order for the mass of material for spreading thus metered to be gravimetrically detected. The control and/or regulating device is furthermore operatively connected to the metering element 17, in order to, from the mass of material for spreading detected by means of the weighing device 100 in relation to the test duration and the operating parameter of the metering element 17 during the calibration test, calculate a functional relationship between the operating parameter of the metering element 17 and the actual mass flow of material for spreading metered by means of said metering element, and to subsequently control and/or regulate the metering element 17 to a setpoint mass flow of material for spreading in a manner dependent on this functional relationship, for example in the form of a metering factor.

Here, the control and/or regulating device may expediently be designed to store the functional relationship, obtained from the mass of a particular type of material for spreading gravimetrically detected during the calibration test, between the operating parameter of the metering element 17 and the actual mass flow of material for spreading, or is connected to a memory device (likewise not shown) suitable for this purpose, in order for said functional relationship to be retrievable when required. Furthermore, said functional relationship may in particular also be updated during the execution of one or more further calibration tests, such that physical changes to the material for spreading during ongoing spreading work, such as may arise in particular owing to an ingress of moisture, do not lead to metering errors. Furthermore, provision may be made whereby, in the control and/or regulation of the metering element 17, in a manner dependent on the functional relationship between the operating parameter of the metering element 17 and the mass of material for spreading metered by means of said metering element during the preceding calibration test, to the desired setpoint mass flow of material for spreading, the control and/or regulating device also takes into consideration further spreading parameters, in particular the working width—for example input by means of an input device, for example in the form of an operating terminal (not shown), assigned to the control and/or regulating device—including possibly provided partial width switching configurations, the traveling speed—likewise for example input or detected by sensor means or using GPS—and/or the actual position of the spreading machine—likewise detected in particular by means of GPS.

The metering element 17 may furthermore be designed in any known manner, wherein, in the present case, it has in each case a metering wheel which can be set in rotation in a controlled and/or regulated manner and which, depending on the type of material for spreading to be dispensed, may be designed for example in the manner of cellular or cam wheels. The operating parameter of the metering element 17 which is taken into consideration during the calibration tests and which serves for the determination of the functional relationship that is definitive for the control and/or regulation of said metering element to the desired setpoint mass flow of material for spreading, such as a metering factor, may consequently be for example the rotational speed, the rotational frequency, the number of rotations, the number of emptied cells or cam troughs of the metering wheel of the metering element 17 or the like. It is likewise for example conceivable for the number of cells or cam troughs of the metering wheel of the metering element 17 emptied during a calibration test to be counted by means of a suitable sensor.

As is also evident from the following description of various embodiments of weighing devices 100 which serve for the gravimetric detection of the material for spreading metered during automated calibration tests, with reference to FIGS. 4 to 14, the metering housing 13 of the metering element 17 has for example an upper inlet 19, which faces toward an outlet of the storage container 1 (see FIG. 1), and a lower outlet 20, which is adjoined by a line 21 which connects the outlet 20 of the metering housing 13 of the metering element 17 to the housing 5 of the transfer chamber 14.

The exemplary embodiments of a weighing device 100, which serves for the automated execution of calibration tests, shown in FIGS. 4 to 8 have in common the fact that said weighing device comprises in each case one weighing container 101 arranged on the one hand directly downstream of the metering element 17 and on the other hand directly upstream of the transfer chamber 14, to which weighing container the material for spreading can be selectively fed during a calibration test, or past which weighing container the material for spreading can be conducted during "normal" spreading work, such that the material for spreading metered by means of the metering element 17 passes from the outlet 20 of the metering housing 13 via the line 21 directly into the transfer chamber 14. The weighing container 101, which may for example have a capacity from approximately 0.5 1 to approximately 5 1 and which may possibly additionally be equipped with fill level sensors (not shown) is in this case arranged at such a height level that, firstly, the material for spreading can, during a calibration test, fall from the outlet 20 of the metering housing 13 into the weighing container 101 purely owing to gravitational force, whereas the material for spreading that has collected in the weighing container 101 during a calibration test can, after the calibration test has ended, be conducted to the transfer chamber 14 again purely under gravitational force, such that the mass of material for spreading metered during the calibration test can be transferred to the conveying line 6 and dispensed via the distributor unit 7 and the spreader lines 8 (see FIG. 1), in order to hereby in particular bridge dead times upon the commencement (resumption) of spreading work and avoid resulting local deficiencies in the supply to the ground.

Figure 4A:
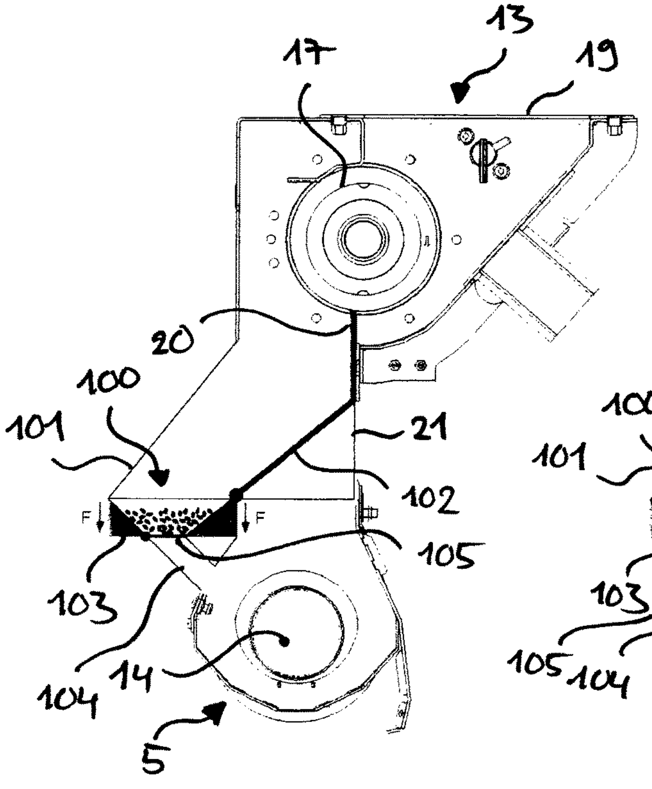
FIGS. 4A and 4B are each schematic sectional views of the metering element and of the transfer chamber of the spreading machine as per FIGS. 1 to 3 with a first embodiment of a weighing device which serves for the automated execution of calibration tests and which is arranged downstream of the metering element and upstream of the transfer chamber and which comprises a weighing container with weighing cells arranged in the interior thereof, in different operating situations.
Figure 4B:
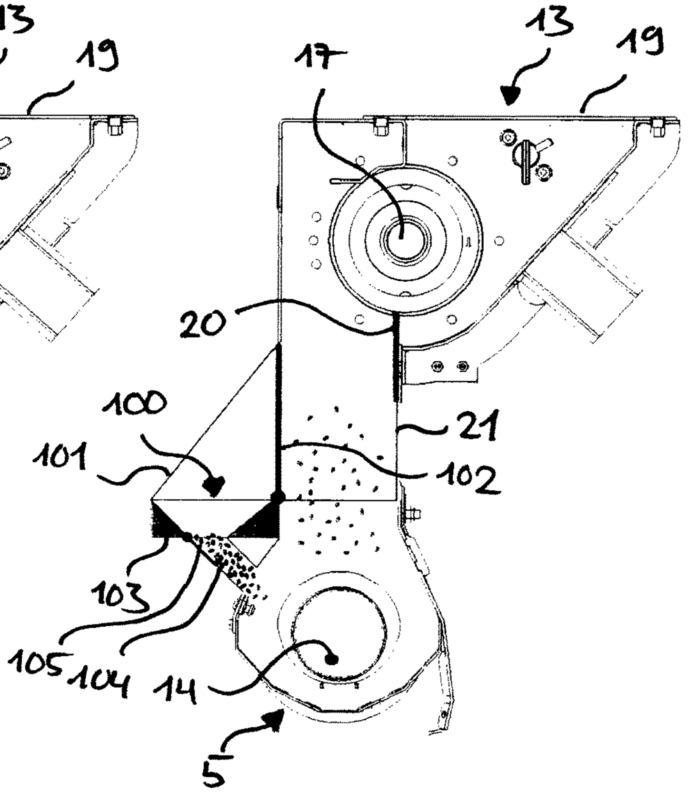

In the case of the embodiment as per FIGS. 4A and 4B, the weighing container 101 of the weighing device 100 is arranged in a radial direction laterally adjacent to the line 21 connecting the metering housing 13 of the metering element 17 to the housing 5 of the transfer chamber 14, wherein, in the line 21, there is provided a switch 102 designed in the form of a guide flap articulated pivotably on said line, which switch is situated, in FIG. 4, in a position in which it feeds all of the metered material for spreading to the weighing container 101 (the calibration test is performed), whereas, in FIG. 4B, said switch is situated in a position in which it feeds all of the metered material for spreading to the transfer chamber 14, such that the weighing container 101 is consequently bypassed (spreading work is performed). On the base of the weighing container 101, there are situated one or more weighing cells 103 for gravimetrically detecting the mass of the material for spreading metered during a calibration test and transmitting this to the control and/or regulating device of the spreading machine. In its base-side region, the weighing container 101 is furthermore connected via a transfer line 104 to the housing 5 of the transfer chamber 14, wherein the transfer line 104 can be closed (see FIG. 4A; the calibration test can be performed) and opened (see FIG. 4B; the material for spreading passes, after the calibration test, into the transfer chamber 14 in order for said material for spreading to be transferred to the conveying line 6 and dispensed) by means of a shut-off element, such as for example a shut-off flap 105.

Figure 5A:
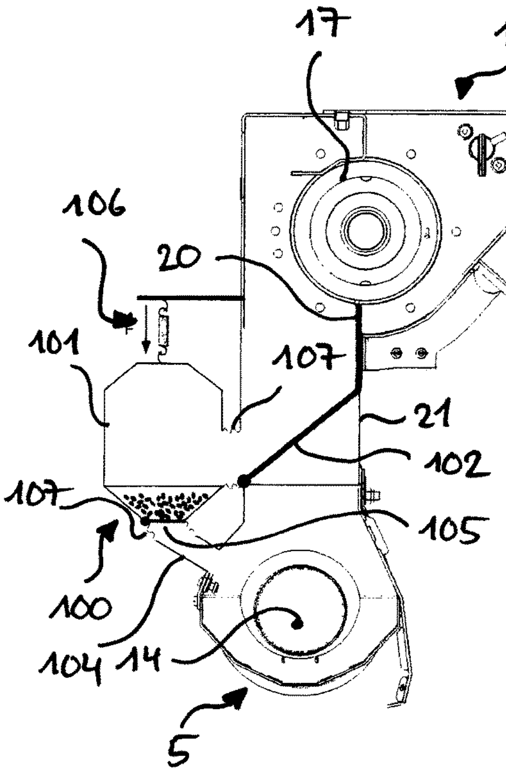
FIGS. 5A and 5B are each schematic sectional views, substantially corresponding to FIGS. 4A and 4B, with a second embodiment, modified in relation thereto, of a weighing device which serves for the automated execution of calibration tests and which is arranged downstream of the metering element and upstream of the transfer chamber and which comprises a weighing container connected to an external container balance, in different operating situations.
Figure 5B:
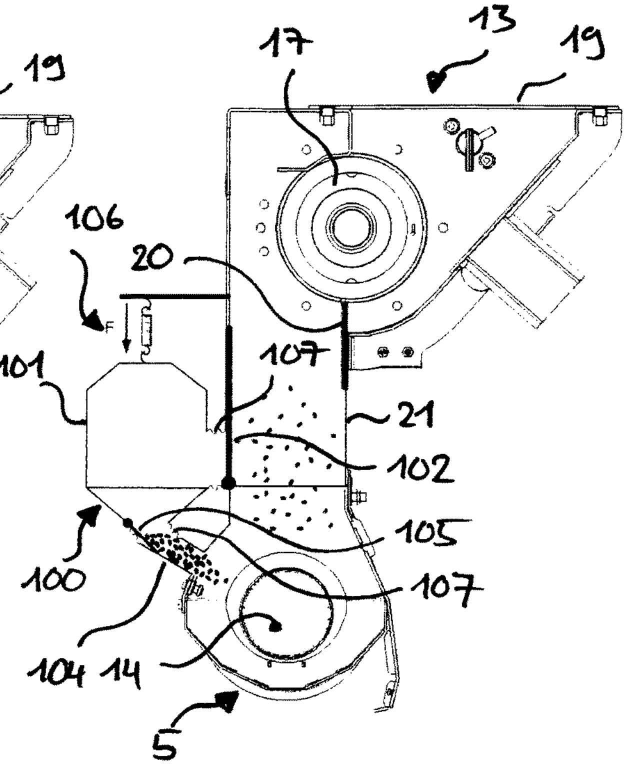

The embodiment of a weighing device 100 illustrated in FIGS. 5A and 5B, in which components which are identical and of identical action are denoted by the same reference designations, differs from that as per FIGS. 4A and 4B primarily in that, instead of the weighing cells 103 arranged in the interior of the weighing container 101 (see FIGS. 4A and 4B), an outer container balance 106 is provided, on which the weighing container 101 is mounted. In order to mechanically decouple said weighing container firstly from the line 21 connecting the metering housing 13 of the meeting element 17 to the housing 5 of the transfer chamber 14 and secondly from the transfer line 104 which opens directly into the housing 5 of the transfer chamber 14, compensation elements 107, for example bellows or hose portions composed of flexible elastic or pliable materials, such as silicone, rubber textile or filter fabric and the like, are arranged between said lines 21, 104 and the weighing container 101.

Figure 6A:
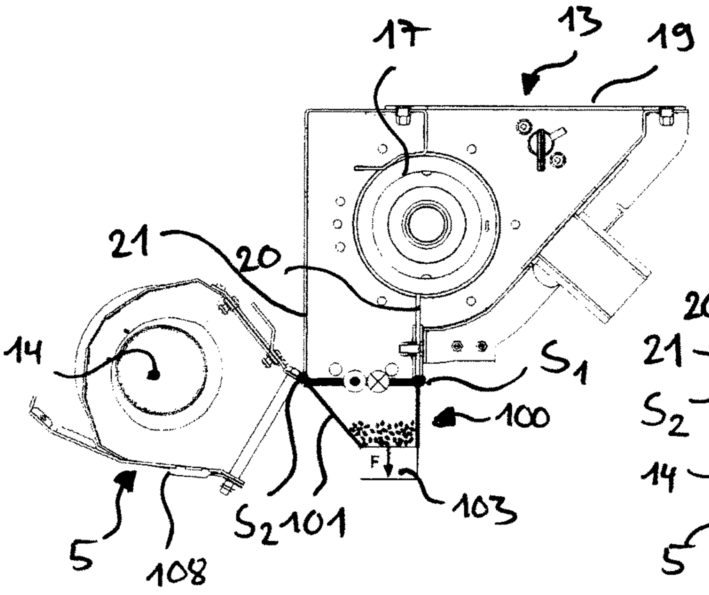
FIGS. 6A and 6B are each schematic sectional views of the metering element and of the pivotably mounted transfer chamber of the spreading machine with a third embodiment of a weighing device which serves for the automated execution of calibration tests and which is arranged downstream of the metering element and upstream of the transfer chamber and which comprises a likewise pivotably mounted weighing container with weighing cells arranged in the interior thereof, in different operating situations.
Figure 6B:
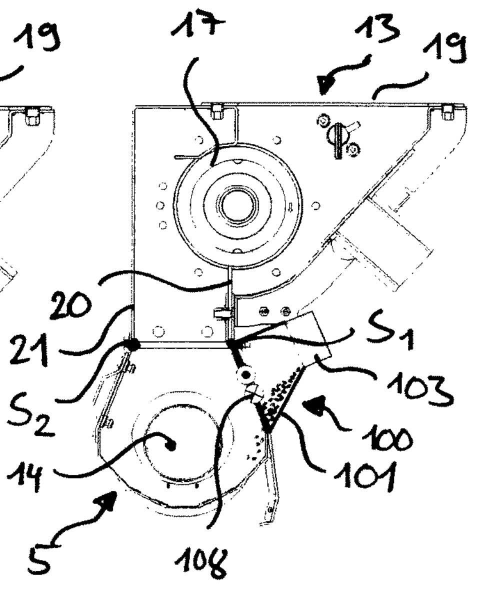

In the case of the embodiment as per FIGS. 6A and 6B, the weighing container 101 of the weighing device 100 is in turn—similarly to FIGS. 4A and 4B—equipped on its base with one or more weighing cells 103 and, in relation to the line 21 connecting the metering housing 13 of the metering element 17 to the housing 5 of the transfer chamber 14, is mounted so as to be pivotable about a pivot axle S1 between a weighing position (FIG. 6A; the calibration test is performed), in which said line opens into the weighing container 101, and a transfer or normal operating position (FIG. 6B; the calibration test is ended and the spreading work can be performed), in which the weighing container 101 opens into the transfer chamber 14. The pivot axle S1 of the weighing container 101 is in the present case arranged at the lower end of the line 21 in the region of the circumference thereof and extends substantially horizontally, that is to say perpendicularly with respect to the line 21. The housing 5 of the transfer chamber 14 is in turn, in relation to the line 21 connecting it to the metering housing 13 of the metering element 17, mounted so as to be pivotable about a pivot axle S2 between the weighing position (FIG. 6A), in which it has been pivoted away from the line 21, and the transfer or normal operating position (FIG. 6B), in which both the weighing container 101 and the line 21 connecting the outlet 20 of the metering housing 13 to the housing 5 of the transfer chamber 14 open into the transfer chamber 14. The latter pivot axle is in the present case likewise arranged at the lower end of the line 21 in the region of the circumference thereof and extends substantially horizontally, that is to say perpendicularly with respect to the line 21, and in particular parallel to the pivot axle S1 of the weighing container 101. In this case, a separate transfer line 104 (see FIGS. 4 and 6) that connects the weighing container 101 to the transfer chamber 14 can be omitted, because, after the ending of the calibration test, the weighing container 101 is, in an overhead position, emptied into the transfer chamber 14 (FIG. 6B) in order for the material for spreading that has been collected during the calibration test to be transferred to the conveying line 6 and dispensed. The housing 5 of the transfer chamber 14 has, for this purpose, that is to say for the purposes of "docking" the weighing container 101 onto the transfer chamber 14 in the situation illustrated in FIG. 6B, an opening 108 which is adapted with regard to its circumferential cross section to the opening cross section of the weighing container 101 and which is furthermore arranged on the upper region of the transfer chamber 14, such that the material for spreading can fall from the weighing container 101 into the transfer chamber 14 purely owing to gravitational force (see FIG. 6B). The opening 108 is expediently closable by means of a suitable cover (not illustrated in the drawing) in order that, in the operating position of the housing 5 equipped with the injector (FIG. 6B), the flow conditions prevailing in the transfer chamber 14 thereof are not influenced in the case of the blower 4 being active.

Figure 7A:
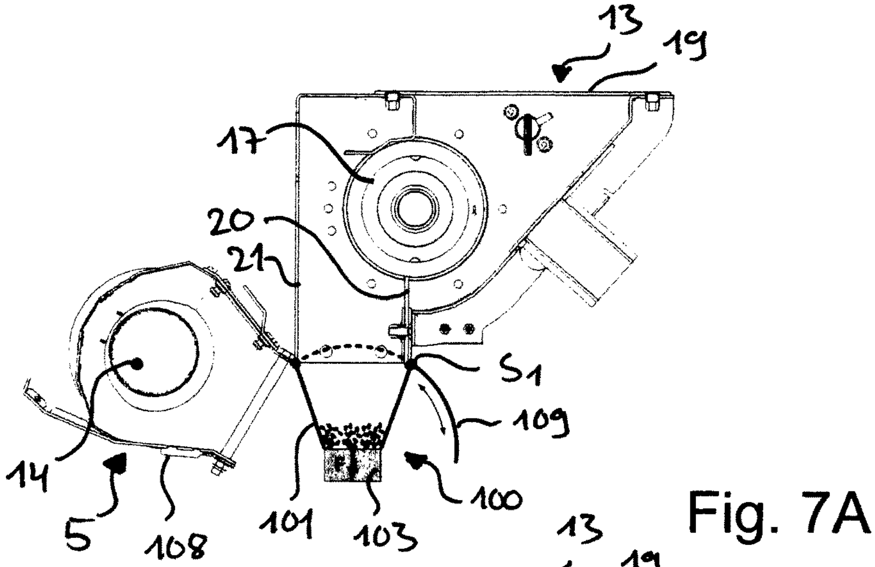
FIGS. 7A, 7B and 7C are each schematic sectional views of the metering element and of the transfer chamber, arranged on a rotary slide, of the spreading machine with a fourth embodiment of a weighing device which serves for the automated execution of calibration tests and which is arranged downstream of the metering element and upstream of the transfer chamber and which comprises a pivotably mounted weighing container with weighing cells arranged in the interior thereof, in different operating situations.
Figure 7B:
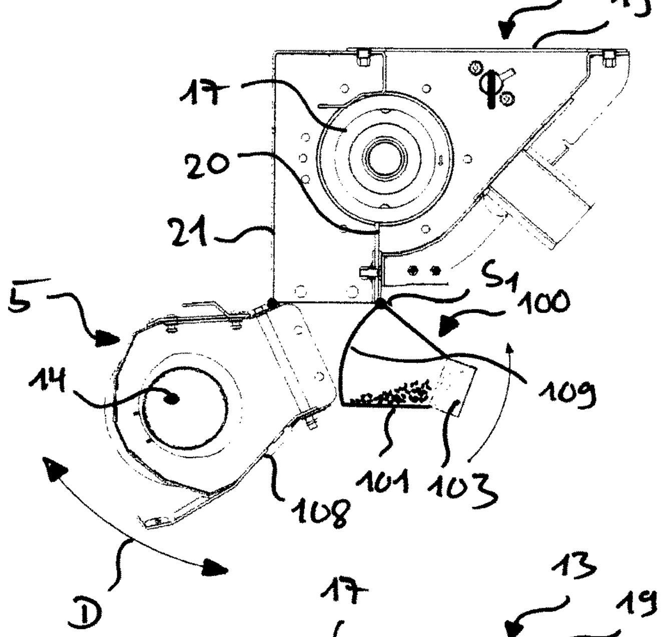
Figure 7C:
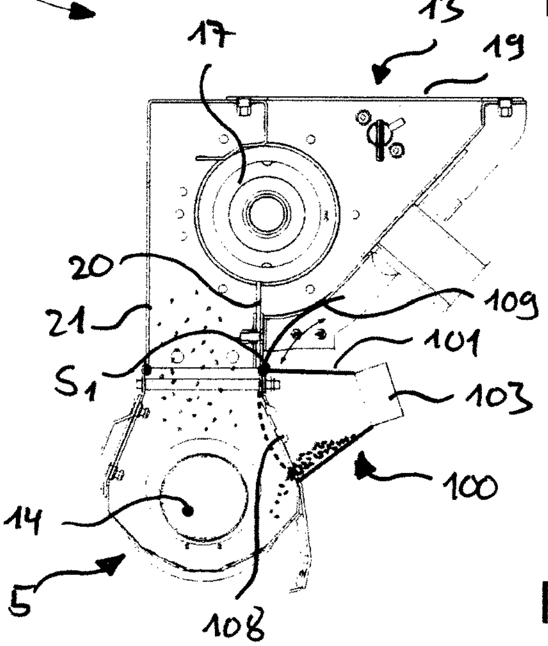
Figure 8A:
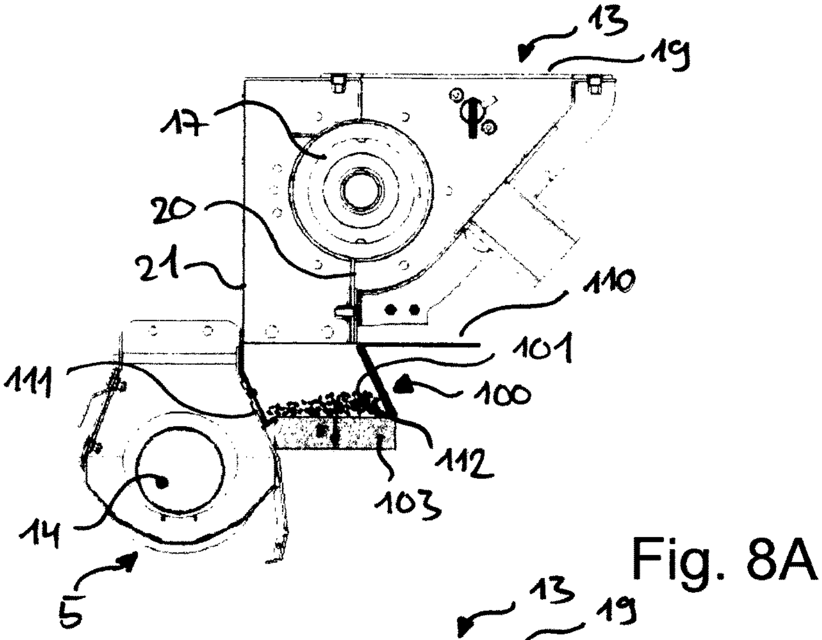
FIGS. 8A, 8B and 8C are each schematic sectional views of the metering element and of the transfer chamber, arranged on a linear slide, of the spreading machine with a fifth embodiment of a weighing device which serves for the automated execution of calibration tests and which is arranged downstream of the metering element and upstream of the transfer chamber and which comprises a weighing container arranged on the same linear slide and which has weighing cells arranged in the interior thereof, in different operating situations.
Figure 8B:
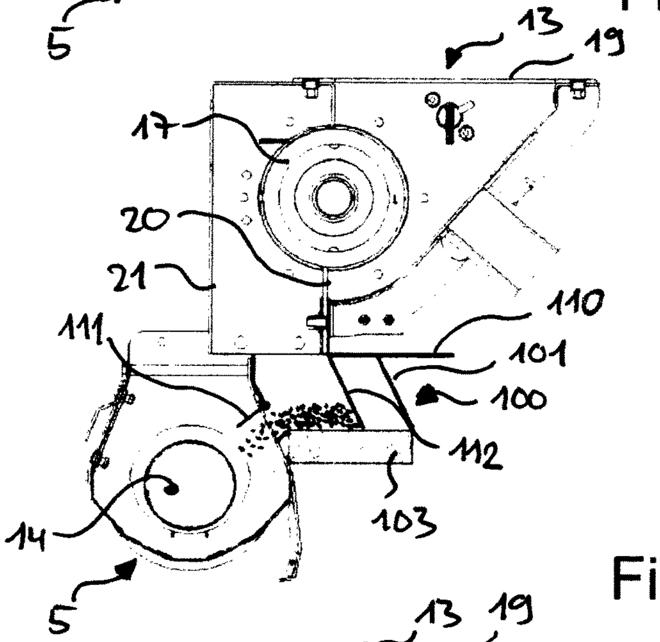
Figure 8C:
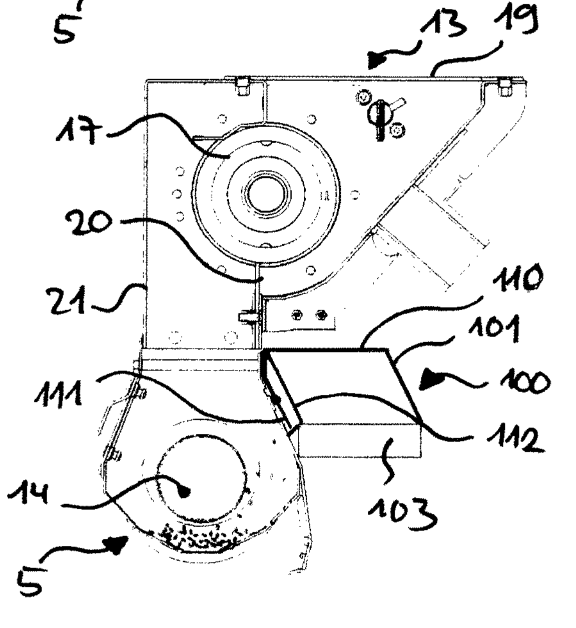

The embodiment of a weighing device shown in FIGS. 7A to 7C, in the case of which components which are identical and of identical action are denoted by the same reference designations, differs from that as per FIGS. 6A and 6B primarily in that the housing 5 of the transfer chamber 14 is not articulated on the line 21 by means of a pivot bearing S2 (see FIGS. 6A and 6B) but is rather arranged on a rotary slide which is situated outside the plane of the drawing and is consequently not illustrated in detail and by means of which the transfer chamber 14 is rotatable in the direction of the arrow D (FIG. 7B) between the weighing position (FIG. 7A; the calibration test is performed), in which said transfer chamber is arranged outside the line 21 that connects it to the metering element 5, and the transfer or normal operating position (FIG. 7C), in which both the weighing container 101 and the line 21 open into said transfer chamber. It is likewise possible in this case to see the cover 109, assigned to the opening 108 provided for the "docking" of the weighing container 101 onto the housing 5 of the transfer chamber 14, of the weighing container 101, which cover is open in the situations shown in FIGS. 7A (the calibration test is performed) and 7C (after the end of the calibration test, the material for spreading that has collected in the weighing container 101 is emptied, in an overhead configuration, into transfer chamber 14), whereas said cover closes the opening cross section of the weighing container 101 when said weighing container is pivoted (FIG. 7B) between the weighing position (FIG. 7A) and the transfer or normal operating position (FIG. 7C) and when, after the transfer of the material for spreading from the weighing container 101 into the transfer chamber 14, the spreading work is performed again with the blower 4 activated (cf. FIG. 1).

In the case of the embodiments of a weighing device 100 shown in FIGS. 8A to 8C, in which, again, components which are identical or of identical action are denoted by the same reference designations and will not otherwise be described again, both the housing 5 of the transfer chamber 14 and the weighing container 101 which is equipped on its base with one or more weighing cells 103 are arranged on a linear slide 110, which in the present case extends substantially horizontally or substantially perpendicularly with respect to the line 21 connecting the metering housing 13 of the metering element 17 to the housing 5 of the transfer chamber 14, at the lower end of said line. Both the housing 5 of the transfer chamber 14 and the weighing container 101 are in this case displaceable jointly between a weighing position (FIG. 8A; the calibration test is performed), in which the line 21 opens into the weighing container 101 and the transfer chamber 14 is arranged laterally outside the cross section of said line 21, and an operating position (FIG. 8C; spreading work can be performed), in which the line 21 opens into the transfer chamber 14 and the weighing container 101 is arranged laterally outside the cross section of said line 21. In order, after a calibration test is performed (FIG. 8A) and before the start of spreading work (FIG. 8C), for the material for spreading that has collected in the weighing container 101 to be transferred into the transfer chamber 14 and then, when the blower 4 is activated, dispensed by the conveying line 6, the weighing container 101 can be selectively connected to and separated from the housing 5, situated adjacent thereto, of the transfer chamber 14. For this purpose, in the lower region of the wall that separates the weighing container 101 from the housing 5 of the transfer chamber 14, there is provided a pivotable flap 111 which is opened (FIG. 8B) during the transfer of the material for spreading accommodated in the weighing container 101 into the transfer chamber 14 after the end of the calibration test. Whereas the material for spreading may in this case also be transferred purely under the action of gravitational force into the transfer chamber 14, in the present case a stripper 112 is used for this purpose, which stripper is for example fixed in static fashion to the linear guide 110 or in the region of that end of the line 21 which is averted from the metering housing 13 with the metering element 17 and which stripper extends from above to the base of the weighing container 101.

Figure 9A:
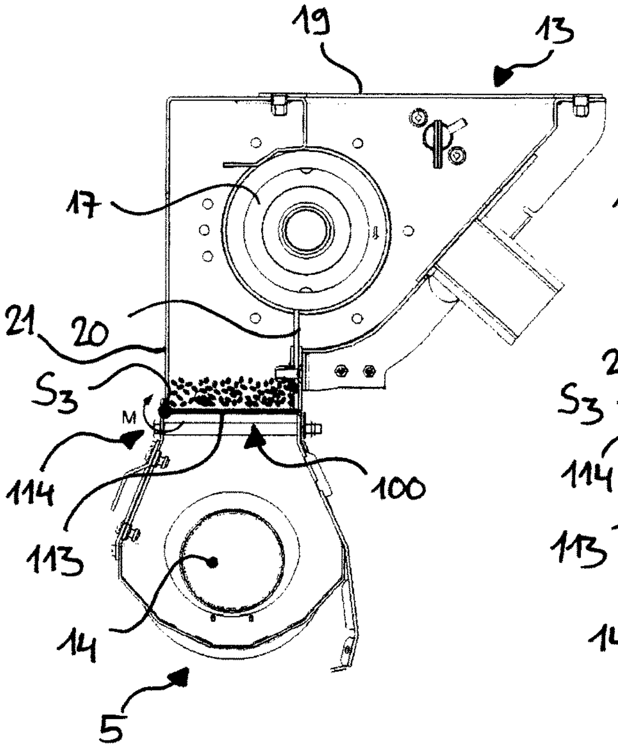
FIGS. 9A and 9B are each schematic sectional views of the metering element and of the transfer chamber of the spreading machine with a sixth embodiment of a weighing device which serves for the automated execution of calibration tests and which is arranged downstream of the metering element and upstream of the transfer chamber and which comprises a flap arranged in the line connecting the metering element to the transfer chamber, which flap has weighing cells arranged on the top side thereof or has torque or torsion sensors arranged on the pivot axle thereof, in different operating situations.
Figure 9B:
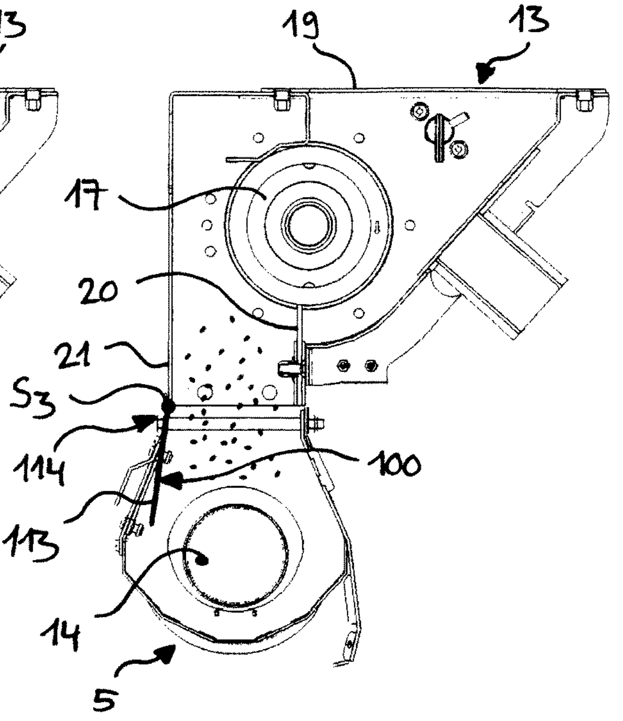
Figure 10A:
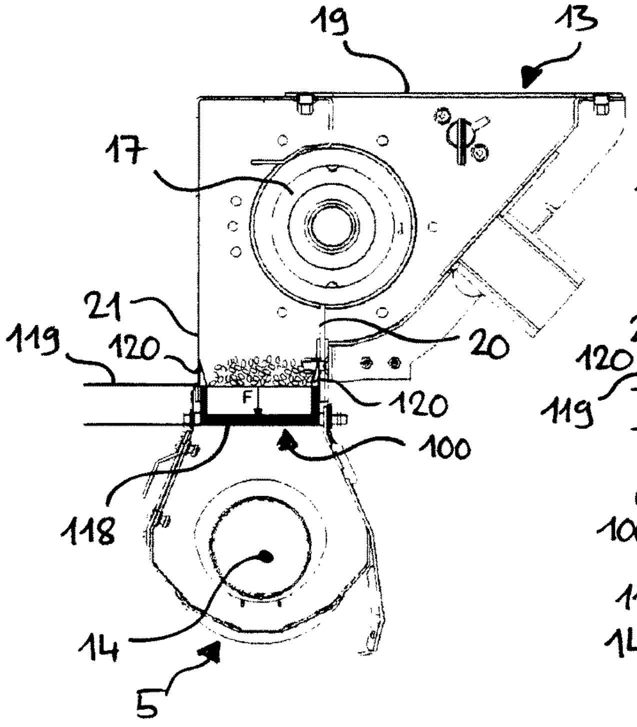
FIGS. 10A and 10B are each schematic sectional views of the metering element and of the transfer chamber of the spreading machine with a seventh embodiment of a weighing device which serves for the automated execution of calibration tests and which is arranged downstream of the metering element and upstream of the transfer chamber and which comprises a slide arranged in the line connecting the metering element to the transfer chamber, which slide has weighing cells arranged on the top side thereof, in different operating situations.
Figure 10B:
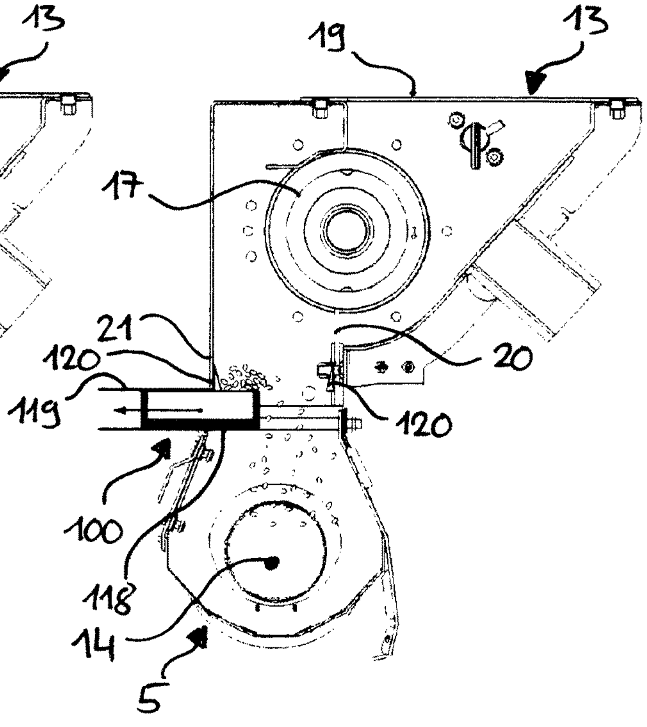

The weighing device 100—which is again arranged in each case directly downstream of the metering element 17 and upstream of the metering chamber 14—both the embodiment as per FIGS. 9A and 9B and the embodiment as per FIGS. 10A and 10B require no dedicated weighing container 101 (cf. FIGS. 3 to 8), by contrast to the preceding exemplary embodiments. In the embodiment shown in FIGS. 9A and 9B, the weighing device 100 instead comprises a flap 113 which is arranged in the line connecting the metering housing 13 of the metering element 17 to the housing 5 of the transfer chamber 14, which flap is pivotable between a weighing position (FIG. 9A; the calibration test is performed), in which said flap closes the cross section of the line 21 and the metered material for spreading is collected on the top side of the flap 113, and an operating position (FIG. 9B; after the calibration test has been performed, the material for spreading that has collected on the flap 113 is transferred into the transfer chamber 14, in order to be able to dispense said material for spreading via the conveying line 6), in which said flap at least partially or in particular entirely opens up the line cross section. The latter indeed also applies for the normal operating position, in which the flap 113 has the task of ensuring an unhindered passage of the metered material for spreading through the line 21 into the transfer chamber 14. In order to gravimetrically detect the mass of material for spreading that has been metered during the execution of calibration tests, the flap 113 may on the one hand be equipped on a flap pivot axle S3 with a torque or torsion sensor; on the hand, it is alternatively also conceivable for the flap 113 to be equipped, at its upper side facing toward the metering element 17, with one or more weighing cells (not shown). The stop or seat, arranged in the interior of the line 21, of the flap 113 in the closed position thereof should furthermore be equipped with corresponding sealing lips so as not to cause any air-pressure-induced calibration errors in the event of the transfer chamber 14 being charged with a blowing air stream during the execution of a calibration test.

In the case of the embodiment illustrated in FIGS. 10A and 10B, the weighing device 100 comprises, instead of the flat 113 (see FIGS. 9A and 9B), a slide 118 which is arranged in the line 21 connecting the metering housing 13 of the metering element 17 to the housing 5 of the transfer chamber 14, which slide is displaceable between a weighing position (FIG. 10A; the calibration test is performed), in which said slide closes the cross section of the line 21 and the metered material for spreading is collected on the top side of the slide 118, and an operating position (FIG. 10B; after the calibration test has been performed, the material for spreading that has collected on the slide 118 is transferred into the transfer chamber 14, in order to be able to dispense said material for spreading via the conveying line 6), in which said slide at least partially or in particular entirely opens up the line cross section. The latter indeed also applies for the normal operating position, in which the slide 118 has the task of ensuring an unhindered passage of the metered material for spreading through the line 21 into the transfer chamber 14. In order to gravimetrically detect the mass of material for spreading that has been metered during the execution of calibration tests, the slide 118 is equipped, at its upper side facing toward the metering element 17, with one or more weighing cells (not shown). In the present case, the slide 118 is displaceable back and forth along a linear guide 119 which extends substantially perpendicularly with respect to the line 21, that is to say substantially horizontally, wherein, in its closed or weighing position as per FIG. 10A, said slide abuts against sealing lips 120 provided in the interior of the line 21. The displacement of the slide 118 is expediently realized, like the pivoting of the flap 113 (FIGS. 9A and 9B), by means of suitable, for example motor-type or actuator-type drives (not shown) which are commanded by the control and/or regulating device of the spreading machine.

Figure 11:
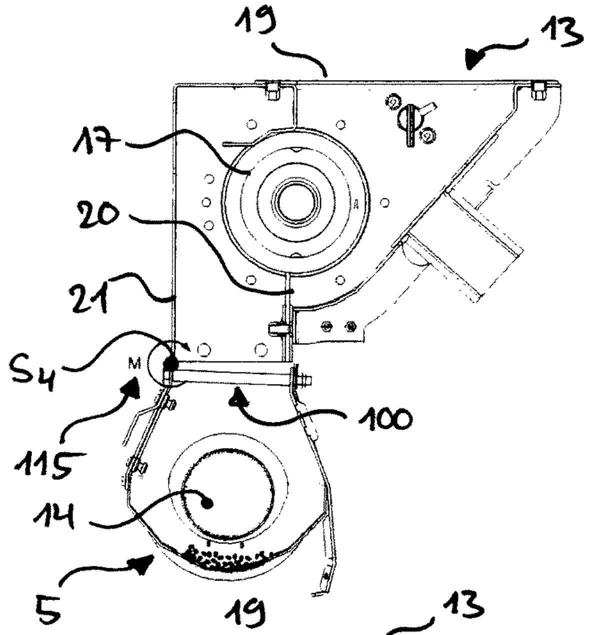
FIG. 11 is a schematic sectional view of the metering element and of the transfer chamber of the spreading machine with an eighth embodiment of a weighing device which serves for the automated execution of calibration tests and which is arranged downstream of the metering element and at the transfer chamber and which comprises a pivot bearing, equipped with a torque or torsion sensor, of the transfer chamber.
Figure 12:
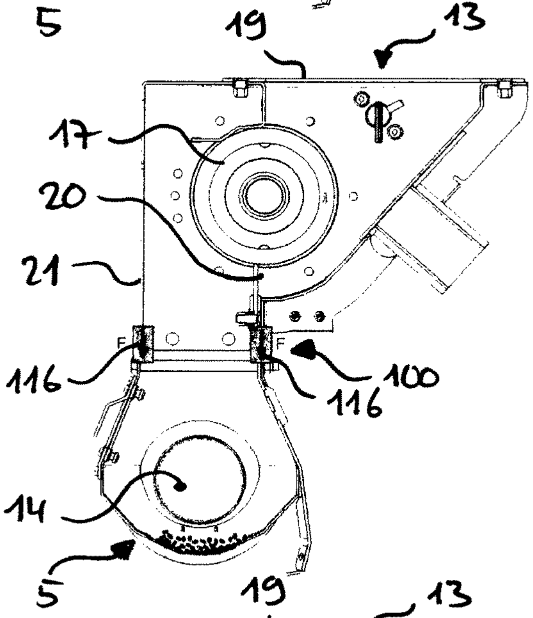
FIG. 12 is a schematic sectional view of the metering element and of the transfer chamber of the spreading machine with a ninth embodiment of a weighing device which serves for the automated execution of calibration tests and which is arranged downstream of the metering element and at the transfer chamber and which comprises a connection, equipped with weighing cells, of the transfer chamber to the line connecting the metering element to the transfer chamber.
Figure 13:
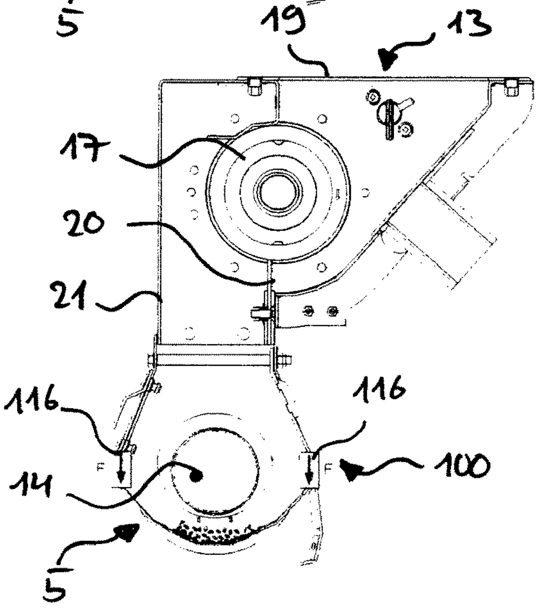
FIG. 13 is a schematic view, substantially corresponding to FIG. 12, with a tenth embodiment, modified in relation thereto of a weighing device which serves for the automated execution of calibration tests and which is arranged downstream of the metering element and at the transfer chamber and in the case of which only the lower portion of the transfer chamber is connected by means of weighing cells to an upper portion thereof.

The embodiments of weighing devices 100 schematically illustrated in FIGS. 11 to 13, which are positioned directly downstream of the metering element 17 on the housing 5 of the transfer chamber 14, likewise provide no additional weighing container, but instead, the housing 5 of the transfer chamber 14 itself serves as a "weighing container", that is to say, during the execution of calibration tests, the material for spreading metered by means of the metering element 17 is collected directly in the transfer chamber 14. The transfer chamber 14 must for this purpose indeed be decoupled from the blower 4 (cf. FIG. 1), or said blower must be deactivated, which can expediently be triggered by means of the control and/or regulating device. After the ending of the calibration test, the blower 4 can then be activated again in order for the material for spreading to be transferred from the transfer chamber 14 into the conveying line 6 and dispensed when or before the "normal" spreading work begins again.

Accordingly, in the embodiment of the weighing device 100 shown in FIG. 11, provision is made for the housing 5 of the transfer chamber 14—similarly to the flap 113 of the exemplary embodiment shown in FIGS. 9A and 9B—to be articulated, so as to be pivotable about the axle S4, on the circumference of the lower end of the line 21, by means of a pivot bearing, wherein the pivot bearing is in turn equipped with a torque or torsion sensor 115 in order to gravimetrically detect the mass of material for spreading that has been collected in the transfer chamber 14 during a calibration test. Instead of the pivot bearing equipped with sensors 115, the housing 5 of the transfer chamber 14 in the case of the embodiment of the weighing device 100 shown in FIG. 12 is, for the same purpose, connected by means of weighing cells 116 to the lower end of the line 21. The exemplary embodiment of the weighing device 100 illustrated in FIG. 13 differs from this basically merely in that only a lower portion of the housing 5 of the transfer chamber 14 is connected by means of the weighing cells 116 to an upper portion of said housing.

Figure 14A:
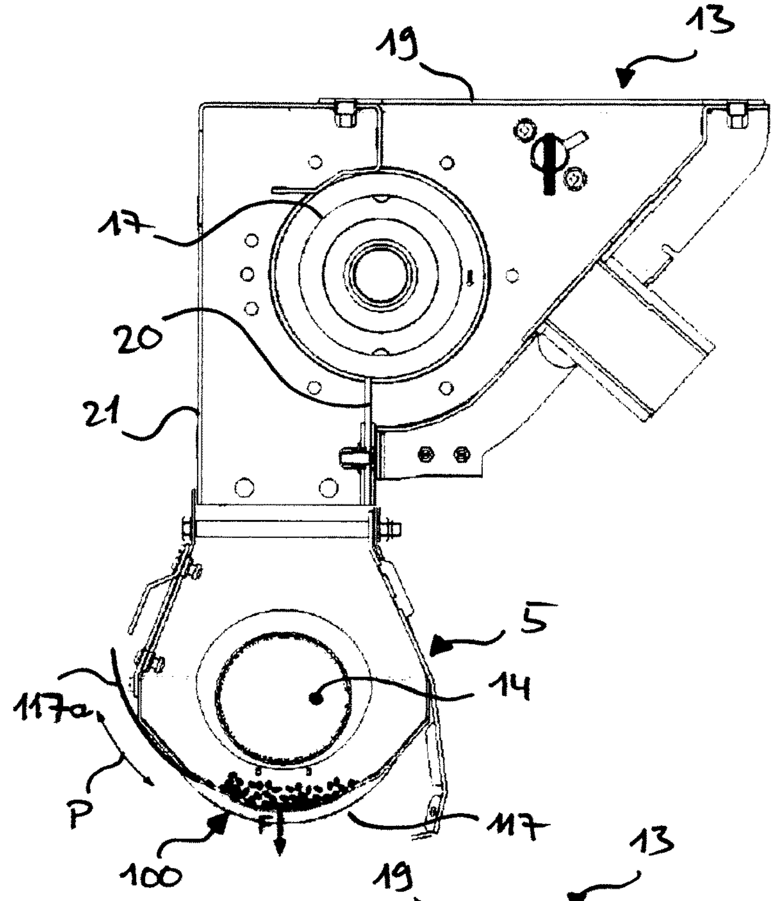
FIGS. 14A and 14B are each schematic sectional views of the metering element and of the transfer chamber of the spreading machine with an eleventh embodiment of a weighing device which serves for the automated execution of calibration tests and which is arranged downstream of the metering element and in the transfer chamber and which has weighing cells arranged on the base of the transfer chamber, in various operating situations.
Figure 14B:
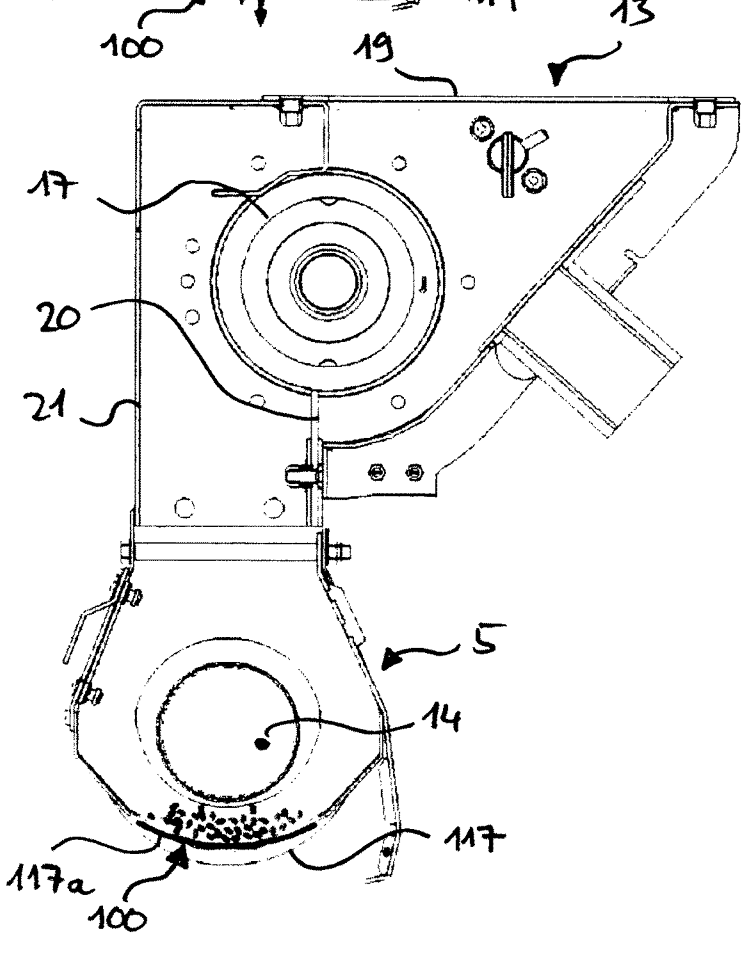

Finally, the weighing device 100 as per the embodiment shown in FIGS. 14A and 14B is arranged downstream of the metering element 17 in the interior of the housing 5 of the transfer housing 14—or more specifically on the base of the transfer chamber 14—and comprises one or more weighing cells 117. Whereas the weighing cells 117 are exposed during the execution of calibration tests with the blower 4 deactivated or decoupled from the transfer chamber 14, such that the material for spreading metered by means of the metering element 17 is collected on said weighing cells (FIG. 14A), the weighing cells 117 are preferably assigned a slide 117*a* which acts for example in the direction of the arrow P of FIG. 14A and by means of which the weighing cells 117 can be covered when the "normal" spreading work is being performed or also when, at the start of said spreading work, the material for spreading that has collected in the transfer chamber 14 during the prior calibration test is to be dispensed via the conveying line 6 by activation of the blower 4 or coupling of said blower to the housing 5 of the transfer chamber 14 (FIG. 13B), such that the weighing cells 117 are not exposed to the air stream laden with particles of material for spreading.

While specific embodiments of the invention have been shown and described in detail to illustrate the application of the principles of the invention, it will be understood that the invention may be embodied otherwise without departing from such principles.

The invention claimed is:

1. A method for controlling and/or regulating a metering element of a pneumatic spreading machine, the method comprising the steps of:

providing the pneumatic spreading machine, the provided pneumatic spreading machine further comprising:

at least one transfer chamber which is arranged downstream of the metering element and which serves for the transfer, into at least one conveying line, of material for spreading that has been metered by means of the metering element;

at least one blower for charging the conveying line with an air stream; and at least one spreading element arranged downstream of the conveying line performing at least one calibration test comprising:

actuating the metering element, charged with a particular type of material for spreading, over a predetermined test duration with a predetermined operating parameter;

gravimetrically detecting a mass of material for spreading metered during the calibration test;

following the detecting of the mass of material for spreading in relation to the test duration and the operating parameters of the metering element, calculating a functional relationship between the operating parameter of the metering element and the actual mass flow of material for spreading metered by means of said metering element; and controlling and/or regulating the metering element to a setpoint mass flow of material for spreading in dependance on the calculated functional relationship, wherein the mass of material for spreading metered during the calibration test gravimetrically detected is detected downstream of the metering element and upstream of the transfer chamber or in the transfer chamber, following which said material for spreading is transferred to the conveying line and dispensed.

2. A method according to claim 1, wherein the material for spreading metered during the calibration test is collected downstream of the metering element and upstream of the transfer chamber, the mass thereof is gravimetrically detected, and it is then released to the transfer chamber; or is collected in the transfer chamber when the blower is decoupled from said transfer chamber and/or deactivated, and the mass thereof is gravimetrically detected, following which the transfer chamber is coupled to the blower and/or the latter is activated.

3. A method according to claim 1, wherein the functional relationship, obtained from the mass of a particular type of material for spreading gravimetrically detected during the calibration test in relation to the test duration and the operating parameter of the metering element, between the operating parameter of the metering element and the actual mass flow of material for spreading is stored in a form of a metering factor, in order for said functional relationship to be retrievable when required, wherein the stored metering factor is updated when a further calibration test is carried out.

4. A method according to claim 1, wherein the mass of material for spreading metered during the calibration test is transferred to the conveying line and dispensed as a normal operating state or immediately before the metering element is, after the end of the calibration test, returned to the normal operating state, in which the mass of material for spreading metered is controlled and/or regulated in accordance with the desired setpoint mass flow.

5. A method according to claim 1, wherein, in the control and/or regulation of the metering element, in dependance on the functional relationship between the operating parameter of the metering element and the mass of material for spreading metered during the preceding calibration test, to the desired setpoint mass flow of material for spreading, at least one spreading parameter from the group comprising working width, traveling speed and actual position of the spreading machine is also taken into consideration.

6. A method according to claim 1, wherein, for the calibration test, a predetermined test duration is taken into consideration, at the start of which the metering element was already actuated, wherein, for the detection of the mass of material for spreading metered during the calibration test, the difference between the mass at the end of the test duration and at the start of the test duration is determined.

7. A pneumatic spreading machine comprising:

at least one metering element;

at least one transfer chamber which is arranged downstream of the metering element and which serves for transferring, into at least one conveying line, material for spreading that has been metered by means of the metering element;

at least one blower for charging the conveying line with an air stream;

at least one spreading element arranged downstream of the conveying line; and at least one weighing device to which a particular type of material for spreading which is to be dispensed can be fed by actuation of the metering element over a predetermined test duration with a predetermined operating parameter during a calibration test, in order to gravimetrically detect the mass of material for spreading thus metered, for carrying out a calibration test, wherein the weighing device is arranged downstream of the metering element and upstream of the transfer chamber, in or at the transfer chamber, such that the mass of material for spreading metered during the calibration test can be transferred to the conveying line and dispensed.

8. A pneumatic spreading machine according to claim 7, further comprising a control and/or regulating device which is operatively connected both to the weighing device and to the metering element and which is configured to, from the mass of material for spreading detected by means of the weighing device in relation to the test duration and the operating parameter of the metering element during the calibration test, calculate a functional relationship between the operating parameter of the metering element and the actual mass flow of material for spreading metered by means of said metering element, and to subsequently control and/or regulate the metering element to a setpoint mass flow of material for spreading in a manner dependent on the calculated functional relationship.

9. A pneumatic spreading machine according to claim 8, wherein the weighing device is arranged downstream of the metering element and upstream of the transfer chamber, wherein the material for spreading can be fed selectively either to the weighing device or, past the latter, to the transfer chamber.

10. A pneumatic spreading machine according to claim 9, wherein the weighing device comprises a weighing container and a switch, arranged in a line connecting the metering element to the transfer chamber, selectively connectable to the metering element or separable therefrom, wherein the weighing container comprises at least one weighing cell arranged in the interior thereof; or is mechanically decoupled from the line connecting the metering element to the transfer chamber, and is connected to an external container balance.

11. A pneumatic spreading machine according to claim 9, wherein the weighing device comprises a weighing container with at least one weighing cell arranged in an interior thereof and mounted so as to be pivotable, in relation to a line connecting the metering element to the transfer chamber, between at least one weighing position, in which said line opens into the weighing container, and at least one transfer position, in which the weighing container opens into the transfer chamber, wherein the transfer chamber:

is arranged on a rotary slide by means of which said transfer chamber is rotatable between the at least one weighing position, in which said transfer chamber is arranged outside the line connecting said transfer chamber to the metering element, and the at least one transfer position, in which both the weighing container and the line connecting the metering element to the transfer chamber open into said transfer chamber; or is mounted so as to be pivotable, in relation to the line connecting said transfer chamber to the metering element, between the at least one weighing position, in which said transfer chamber is pivoted away from the line connecting said transfer chamber to the metering element, and the at least one transfer position, in which both the weighing container and the line connecting the metering element to the transfer chamber open into said transfer chamber.

12. A pneumatic spreading machine according to claim 9, wherein the weighing device has a weighing container with at least one weighing cell arranged in the interior thereof, and both the transfer chamber and the weighing container are arranged on a linear slide (110) which acts in particular substantially perpendicularly with respect to a line connecting the metering element to the transfer chamber, wherein the transfer chamber and the weighing container are displaceable between at least one weighing position, in which the line connecting the metering element to the transfer chamber opens into the weighing container and the transfer chamber is arranged outside the cross section of said line, and at least one operating position, in which the line connecting the metering element to the transfer chamber opens into the transfer chamber and the weighing container is arranged outside the cross section of said line, and wherein furthermore, the weighing container is, by means of a flap (111), selectively connectable to the transfer chamber and separable therefrom.

13. A pneumatic spreading machine according to claim 9, wherein the transfer of the material for spreading metered during a calibration test from the weighing container into the transfer chamber is performed under the action of gravitational force and/or by means of the air stream generated by the blower.

14. A pneumatic spreading machine according to claim 9, wherein the weighing device comprises:

a flap which is arranged in a line connecting the metering element to the transfer chamber and which is pivotable between a weighing position, in which it closes the line cross section, and an operating position, in which it at least partially opens up the line cross section, wherein the flap is equipped with a weighing cell and/or the pivot axle (S3) thereof is equipped with a torque or torsion sensor; or a slide arranged in the line connecting the metering element to the transfer chamber, which slide is displaceable between a weighing position, in which the slide closes a line cross section, and an operating position, in which the slide at least partially opens up the line cross section, wherein the slide is equipped with a weighing cell.

15. A pneumatic spreading machine according to claim 8, wherein the weighing device comprises a weighing cell arranged in an interior of the transfer chamber, at a base thereof, wherein the weighing cell (117) is exposed and covered by means of a slide situated at the inside.

16. A pneumatic spreading machine according to claim 8, wherein at least one lower portion of the transfer chamber is connected by means of at least one weighing cell; or by means of at least one pivot bearing equipped with a torque or torsion sensor to the line connecting the metering element to the transfer chamber.

17. A pneumatic spreading machine according to claim 15, wherein the control and/or regulating device deactivates the blower or separates said blower from the transfer chamber, or, in the case of the blower being active, generates a warning message if the weighing device, during the calibration test, that detects the mass of material for spreading hereby metered.

18. A pneumatic spreading machine according to claim 8, wherein the control and/or regulating device is designed to store the functional relationship, obtained from the mass of a particular type of material for spreading gravimetrically detected during the calibration test in relation to the test duration and the operating parameter of the metering element, between the operating parameter of the metering element and the actual mass flow of material for spreading, in particular in the form of a metering factor, or is connected to a memory device suitable for this purpose, in order for said functional relationship to be retrievable when required, wherein the control and/or regulating device is configured to update the functional relationship when a further calibration test is carried out.

19. A pneumatic spreading machine according to claim 8, wherein the control and/or regulating device is configured to set the metering element into a normal operating state, in which the control and/or regulating device controls and/or regulates the metering element in accordance with the desired setpoint mass flow, as or immediately after the mass of material for spreading metered during the calibration test is, after the end of the calibration test, transferred to the conveying line and dispensed.

20. A pneumatic spreading machine according to claim 8, wherein, in the control and/or regulation of the metering element, in a manner dependent on the functional relationship between the operating parameter of the metering element and the mass of material for spreading metered during the preceding calibration test, to the desired setpoint mass flow of material for spreading, the control and/or regulating device also takes into consideration at least one spreading parameter from the group comprising working width, traveling speed and actual position of the spreading machine.

* * * * *